US012641102B2

(12) United States Patent
Oba et al.

(10) Patent No.: US 12,641,102 B2
(45) Date of Patent: May 26, 2026

(54) MONITORING APPARATUS AND MONITORING METHOD

(71) Applicant: Panasonic Intellectual Property Corporation of America, Torrance, CA (US)

(72) Inventors: Tatsumi Oba, Chiba (JP); Takuji Hiramoto, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 139 days.

(21) Appl. No.: 18/508,920

(22) Filed: Nov. 14, 2023

(65) Prior Publication Data

US 2024/0080334 A1     Mar. 7, 2024

Related U.S. Application Data

(63) Continuation of application No. PCT/JP2022/018411, filed on Apr. 21, 2022.

(30) Foreign Application Priority Data

May 26, 2021     (JP) .................................. 2021-088818

(51) Int. Cl.
*H04L 9/40*          (2022.01)
(52) U.S. Cl.
CPC ................................. *H04L 63/1425* (2013.01)
(58) Field of Classification Search
USPC ......................................................... 726/23
See application file for complete search history.

(56) References Cited

U.S. PATENT DOCUMENTS

| | | | |
|---|---|---|---|
| 11,580,002 B2 * | 2/2023 | Rome | G06F 21/316 |
| 2005/0265331 A1 | 12/2005 | Stolfo | |
| 2006/0154642 A1 * | 7/2006 | Scannell | G08B 21/14 |
| | | | 455/404.1 |

(Continued)

FOREIGN PATENT DOCUMENTS

| | | | | |
|---|---|---|---|---|
| CN | 107368198 A | * | 11/2017 | G06F 3/0233 |
| CN | 107871128 A | * | 4/2018 | G06K 9/00442 |

(Continued)

OTHER PUBLICATIONS

International Search Report (ISR) from International Searching Authority (Japan Patent Office) in International Pat. Appl. No. PCT/JP2022/018411, dated Jun. 28, 2022, together with an English language translation.

(Continued)

*Primary Examiner* — Sakinah White-Taylor
(74) *Attorney, Agent, or Firm* — Greenblum & Bernstein, P.L.C.

(57)          ABSTRACT

A monitoring apparatus includes: a user input acquirer that acquires information based on input provided by a user to a user input device; and a communication anomaly detector that detects a communication anomaly in communication that is being observed, and the communication anomaly detector detects the communication anomaly based on information about a packet whose source or destination includes a monitoring target device and the information based on the input corresponding to the packet.

18 Claims, 23 Drawing Sheets

```
2020-1-10 9:01:01 > pws 2020-1-10 9:01:20 > aaaaa 2020-1-10 9:03:05 > qwerty 2020-1-10 10:53:03 > scp ./setting/ideal_setting.txt user@192.168.1.102:/home/user/setting/setting.txt
```

(56)                    References Cited

U.S. PATENT DOCUMENTS

| | | | | |
|---|---|---|---|---|
| 2007/0074272 A1* | 3/2007 | Watanabe | ........... | H04L 63/1408 |
| | | | | 726/3 |
| 2007/0100959 A1* | 5/2007 | Eichstaedt | ........... | H04L 67/306 |
| | | | | 709/217 |
| 2008/0021963 A1* | 1/2008 | Jana | .................... | H04L 12/1827 |
| | | | | 707/E17.116 |
| 2018/0248903 A1 | 8/2018 | Villella et al. | | |

FOREIGN PATENT DOCUMENTS

| | | | | | | |
|---|---|---|---|---|---|---|
| CN | 113190804 A | * | 7/2021 | ........... | G06F 21/121 |
| JP | 2001-217959 | | 8/2001 | | |
| JP | 2013168763 A | * | 8/2013 | ......... | H04L 63/1416 |
| JP | 5307090 | | 10/2013 | | |
| JP | 2015032916 A | * | 2/2015 | ........... | G06F 17/211 |
| JP | 2016148858 A | * | 8/2016 | | |

OTHER PUBLICATIONS

Extended European Search Report (EESR) from European Patent
Office (EPO) in European Patent Appl. No. 22811090.4, dated Jun.
26, 2024.

* cited by examiner

| No. | Communication monitoring target IP address |
|---|---|
| No.1 | 192.168.1.101 |
| No.2 | 192.168.1.102 |
| No.3 | 192.168.1.103 |
| ... | ... |

FIG. 4

| Anomaly detection algorithm | ON/OFF | Learning period (days) | Relearning frequency (days) | Model switching depending on user input for most recent N seconds |
|---|---|---|---|---|
| Control command WL | ☑ | 14 | 7 | ☑ (N=5) |
| Maximum value/minimum value WL | ☑ | 14 | 7 | ☐ |
| Payload string anomaly detection | ☐ | 7 | 1 | ☑ (N=5) |
| ... | ... | ... | ... | ... |

FIG. 5

```
2020-1-10 9:01:01 > pws
2020-1-10 9:01:20 > aaaaa
2020-1-10 9:03:05 > qwerty
2020-1-10 10:53:03 > scp ./setting/ideal_setting.txt
user@192.168.1.102:/home/user/setting/setting.txt
```

| Time | Source IP | Destination IP | Command | Most recent user input | Degree of anomaly |
|---|---|---|---|---|---|
| 2020-1-10 9:20:13 | 192.168.1.101 | 192.168.1.102 | write | 2020-1-10 9:20:12 | 30 |
| 2020-1-11 0:05:51 | 192.168.1.101 | 192.168.1.102 | write | | 90 |

FIG. 8A

Control command white list (without most recent user input)

207a

| No. | Source IP | Destination IP | Observation command |
|-----|-----------|----------------|---------------------|
| No.1 | 192.168.1.101 | 192.168.1.102 | read |
| No.2 | 192.168.1.101 | 192.168.1.102 | write |
| No.3 | 192.168.1.101 | 192.168.1.103 | upload |
| ... | ... | ... | ... |

Control command white list (with most recent user input)

| No. | Source IP | Destination IP | Observation command |
|-----|-----------|----------------|---------------------|
| No.1 | 192.168.1.101 | 192.168.1.102 | upload |
| No.2 | 192.168.1.101 | 192.168.1.102 | write |
| No.3 | 192.168.1.101 | 192.168.1.103 | write |
| ... | ... | ... | ... |

Control command white list

| No. | Device IP | Object ID | Maximum value/minimum value |
|-----|-----------|-----------|------------------------------|
| No.1 | 192.168.1.101 | Analog Value 100 | min: -10.0, max: 9.8 |
| No.2 | 192.168.1.101 | Binary Value 51 | min: 0, max: 0 |
| No.3 | 192.168.1.102 | Analog Value 200 | min: 53.0, max: 89.2 |
| ... | ... | ... | ... |

Figure 12:
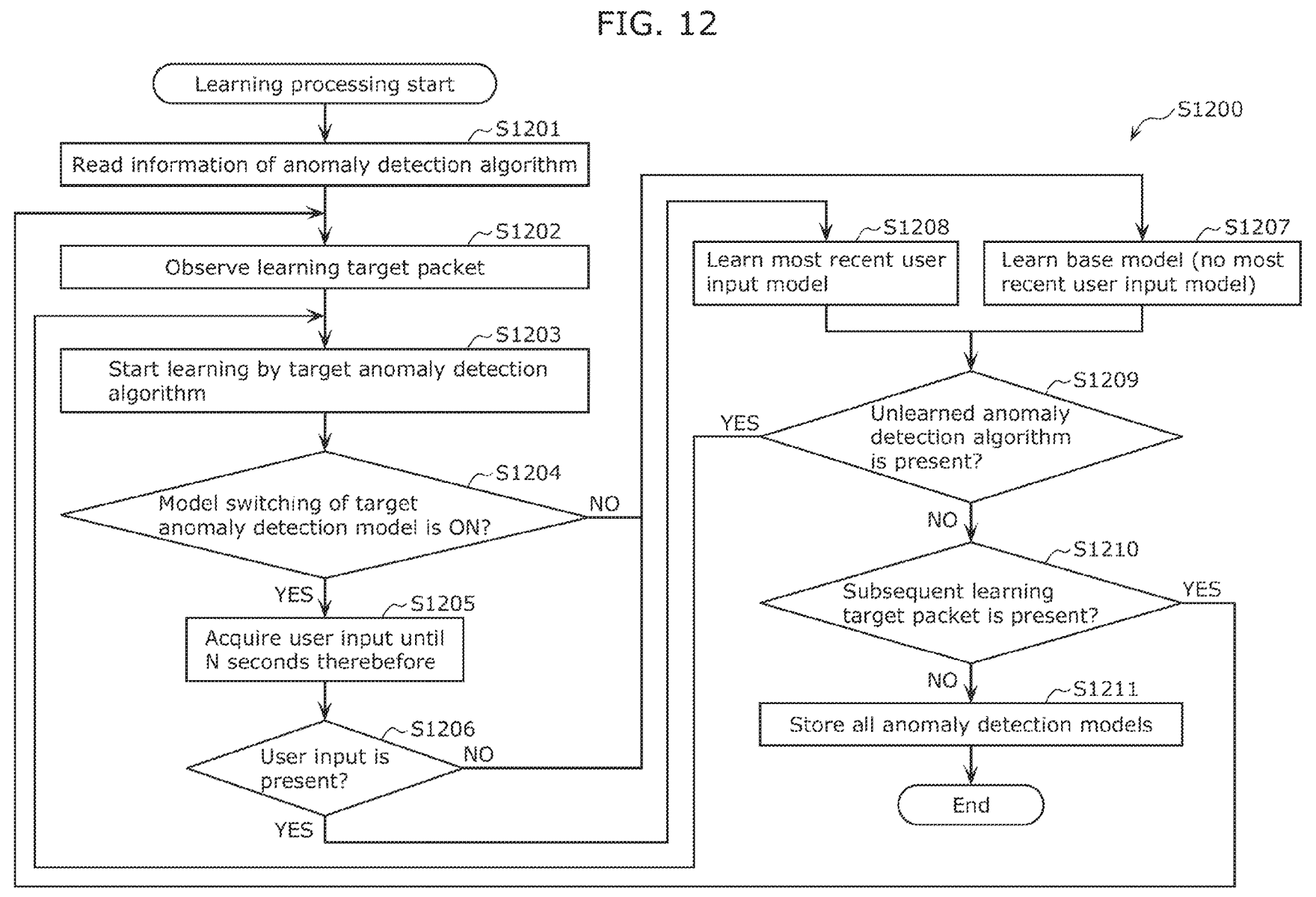

Learning processing start

S1201 — Read information of anomaly detection algorithm

S1202 — Observe learning target packet

S1203 — Start learning by target anomaly detection algorithm

S1204 — Model switching of target anomaly detection model is ON?

NO

YES

S1205 — Acquire user input until N seconds therebefore

S1206 — User input is present?

NO

YES

S1208 — Learn most recent user input model

S1207 — Learn base model (no most recent user input model)

S1209 — Unlearned anomaly detection algorithm is present?

YES

NO

S1210 — Subsequent learning target packet is present?

YES

NO

S1211 — Store all anomaly detection models

End

Figure 15:
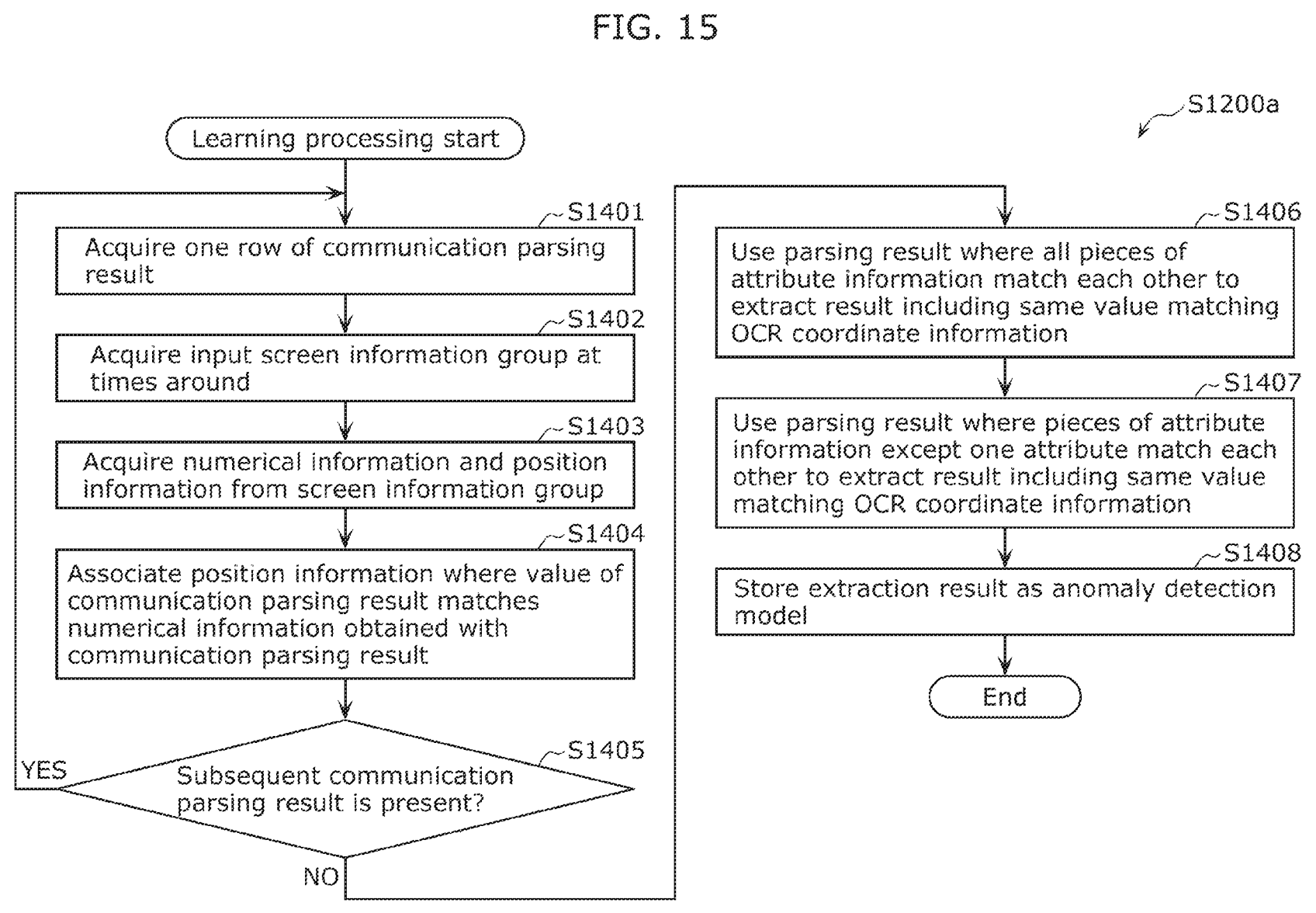

Learning processing start

S1401 — Acquire one row of communication parsing result

S1402 — Acquire input screen information group at times around

S1403 — Acquire numerical information and position information from screen information group S1404 — Associate position information where value of communication parsing result matches numerical information obtained with communication parsing result S1405 — Subsequent communication parsing result is present?

YES

NO

S1406 — Use parsing result where all pieces of attribute information match each other to extract result including same value matching OCR coordinate information S1407 — Use parsing result where pieces of attribute information except one attribute match each other to extract result including same value matching OCR coordinate information S1408 — Store extraction result as anomaly detection model End

FIG. 16

| Time | Source IP | Destination IP | Command | Object ID | Current value |
|---|---|---|---|---|---|
| 2020-1-10 9:20:12 | 192.168.1.101 | 192.168.1.102 | write | analog output 101 | 1150 |
| 2020-1-10 9:23:51 | 192.168.1.101 | 192.168.1.103 | read | analog input 12 | 312 |
| 2020-1-19 9:25:45 | 192.168.1.101 | 192.168.1.102 | write | analog output 101 | 1250 |

FIG. 17
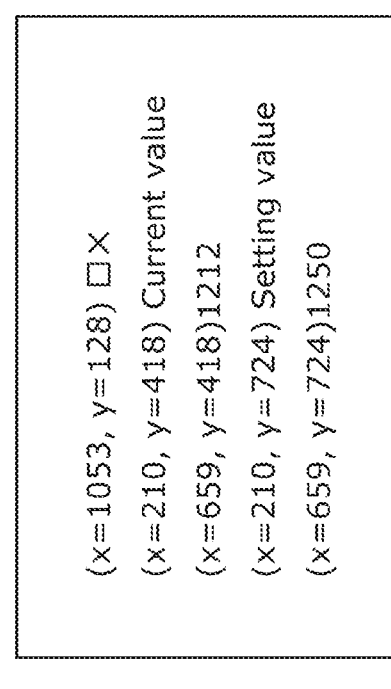
(x=1053, y=128) □×
(x=210, y=418) Current value
(x=659, y=418)1212
(x=210, y=724) Setting value
(x=659, y=724)1250
OCR result
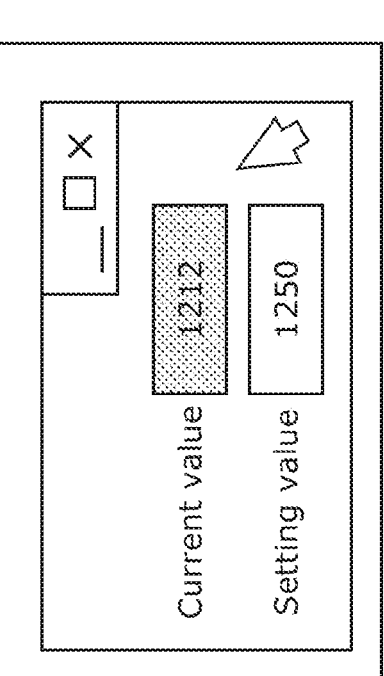
Current value 1212
Setting value 1250
Screen information

FIG. 18

| Time | Source IP | Destination IP | Command | Object ID | Current value | Value matching OCR coordinates |
|---|---|---|---|---|---|---|
| 2020-1-10 9:20:12 | 192.168.1.101 | 192.168.1.102 | write | analog output 101 | 1150 | (x=659, y=724) |
| 2020-1-10 9:23:51 | 192.168.1.101 | 192.168.1.103 | read | analog input 12 | 312 | |
| 2020-1-19 9:25:45 | 192.168.1.101 | 192.168.1.102 | write | analog output 101 | 1250 | (x=659, y=418) (x=659, y=724) |

FIG. 19

| Source IP | Destination IP | Command | Object ID | Value matching OCR coordinates |
|---|---|---|---|---|
| 192.168.1.101 | 192.168.1.102 | write | *** | (x=659, y=724) |
| 192.168.1.101 | 192.168.1.102 | write | analog output 101 | (x=705, y=512) |
| 192.168.1.101 | 192.168.1.103 | read | analog input 12 | (x=100, y=200) |

FIG. 20

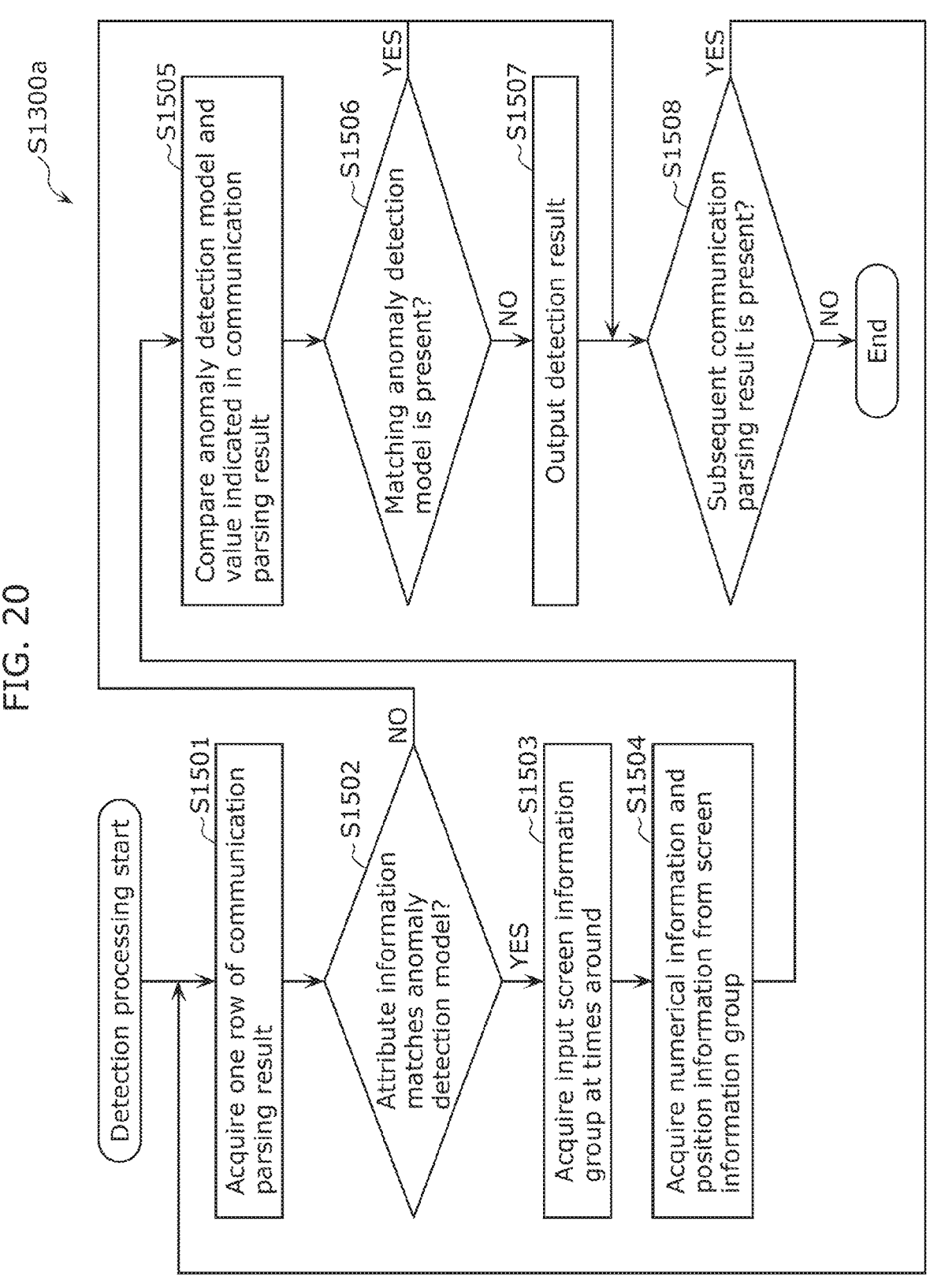

S1300a

Detection processing start

S1501
Acquire one row of communication parsing result

S1502
Attribute information matches anomaly detection model?

NO

YES

S1503
Acquire input screen information group at times around

S1504
Acquire numerical information and position information from screen information group S1505
Compare anomaly detection model and value indicated in communication parsing result S1506
Matching anomaly detection model is present?

YES

NO

S1507
Output detection result

S1508
Subsequent communication parsing result is present?

YES

NO

End

MONITORING APPARATUS AND MONITORING METHOD

CROSS REFERENCE TO RELATED APPLICATIONS

This is a continuation application of PCT International Application No. PCT/JP2022/018411 filed on Apr. 21, 2022, designating the United States of America, which is based on and claims priority of Japanese Patent Application No. 2021-088818 filed on May 26, 2021. The entire disclosures of the above-identified applications, including the specifications, drawings and claims are incorporated herein by reference in their entirety.

FIELD

The present disclosure relates to monitoring apparatuses and monitoring methods.

BACKGROUND

Conventionally, a control system installed in factory facilities or the like adopts its own communication system, and achieves connection and communication by its own communication lines to perform an operation. However, with the widespread use of the Internet, communication standards between control devices have been increasingly used that utilize Ethernet (registered trademark) and Internet Protocol (IP) which are general-purpose protocols having a higher speed and a lower cost.

However, the use of general-purpose communication standards increases the risk of cyberattacks including malware.

Hence, in a control system inside factory facilities, attempts are often made to monitor a network using an intrusion detection system (IDS) to detect and handle anomalous communication. In the control system, processing basically occurs automatically according to a predetermined logic, and traffic necessary for the processing is generated, with the result that it is easy to learn a basic behavior. Hence, anomalous communication is often detected using the IDS which has a behavior anomaly detection function.

As a method for realizing behavior anomaly detection, for example, there is a method disclosed in Patent Literature (PTL) 1. PTL 1 discloses a method for detecting an anomaly using the appearance frequency distribution of byte strings in the payload of normal data.

CITATION LIST

Patent Literature

[PTL 1] Japanese Patent No. 5307090

SUMMARY

Technical Problem

However, in the control system, human operations are often performed during irregular operations such as occasional maintenance. Human operations tend to be different from operations generated by normal automatic processing, and thus the IDS which has the behavior anomaly detection function often detects the human operation as anomalous communication.

The present disclosure provides a monitoring apparatus and a monitoring method which can suppress erroneous detection which can be caused by human operations.

Solution to Problem

A monitoring apparatus according to an aspect of the present disclosure includes: a user input acquirer that acquires information based on input provided by a user to an input device; and a communication anomaly detector that detects a communication anomaly in communication that is being observed, and the communication anomaly detector detects the communication anomaly based on information about a packet whose source or destination includes a monitoring target device and the information based on the input corresponding to the packet.

A monitoring method according to an aspect of the present disclosure includes: acquiring information based on input provided by a user to an input device; and detecting a communication anomaly based on information about a packet whose source or destination includes a monitoring target device and information based on the input corresponding to the packet.

Advantageous Effects

In a monitoring apparatus and a monitoring method according to an aspect of the present disclosure, it is possible to suppress erroneous detection which can be caused by human operations.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram showing the configuration of the monitoring apparatus according to the embodiment.

FIG. 3 is a diagram showing setting information on communication monitoring target IP addresses stored in a setting storage in the embodiment.

FIG. 4 is a diagram showing setting information for anomaly detection algorithms utilized and stored in the setting storage in the embodiment.

FIG. 5 is a diagram showing key input information obtained by the monitoring apparatus according to the embodiment from a key logger operated in a central monitoring control device.

FIG. 7 is a diagram showing a detection result output by a communication anomaly detector in the embodiment.

FIG. 8A is a diagram showing a control command white list which is one type of anomaly detection model.

FIG. 8B is a diagram showing another control command white list which is one type of anomaly detection model.

FIG. 9 is a diagram showing a maximum value/minimum value white list which is one type of anomaly detection model.

FIG. 12 is a flowchart showing learning processing of the monitoring apparatus according to the embodiment.

FIG. 14 is a block diagram showing the configuration of a control system which uses a monitoring apparatus according to Variation 1 of the embodiment.

FIG. 15 is a flowchart showing learning processing of a monitoring apparatus according to Variation 2 of the embodiment.

FIG. 16 is a diagram showing an example of data obtained by parsing a control packet.

FIG. 17 is a diagram showing text information obtained when optical character recognition (OCR) with the screen information set to input is performed.

FIG. 18 is a diagram showing an example of data in which the text information obtained by performing OCR on the screen information is associated with the data obtained by parsing the control packet.

FIG. 19 is a diagram showing an example of an anomaly detection model in Variation 2 of the embodiment.

FIG. 20 is a flowchart showing the detection processing of the monitoring apparatus according to Variation 2 of the embodiment.

Figure 1:
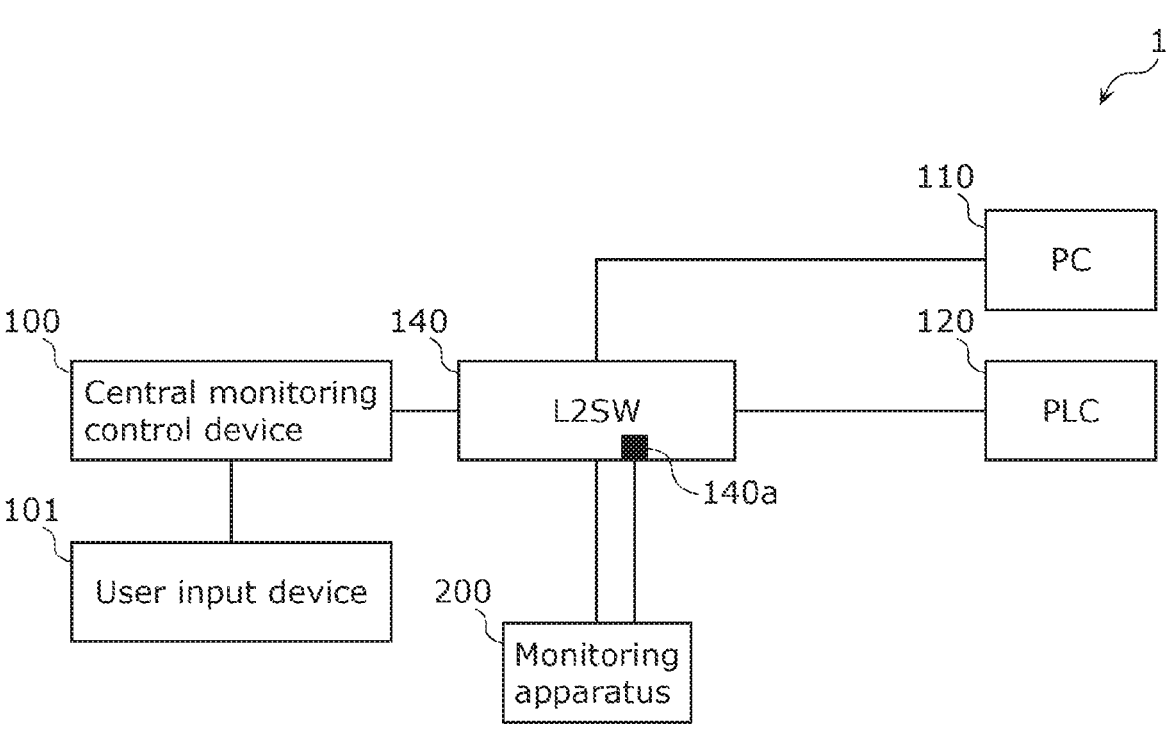
FIG. 1 is a block diagram showing the configuration of a control system which uses a monitoring apparatus according to an embodiment.

DESCRIPTION OF EMBODIMENTS (Circumstances Leading to Aspect of the Present Disclosure)

The number of cyberattacks on industrial control systems (ICS) tends to increase. Since in the ICS, a command string in a normal format which controls a device can be a serious attack target, once the system has been invaded, an attack which cannot be detected by a conventional IDS that detects an anomaly using a signature can be performed more easily than IT systems.

Hence, in order to quickly detect and handle an attack against the ICS, it is conceivable to apply a communication anomaly detection algorithm which utilizes machine learning. The machine learning anomaly detection algorithm can detect communication having different characteristics from normal communication, and thereby can detect an attack which cannot be detected by a signature.

However, when the anomaly detection algorithm which utilizes machine learning is actually applied to the ICS, it is found that a large number of erroneous detections occur. A careful investigation of causes of the erroneous detections which occurred has revealed that communication caused not by routine mechanical processing but by maintenance, interrupt processing performed by a system administrator and the like is erroneously detected as an anomaly.

Hence, the inventors have conducted thorough study in order to solve this problem. Then, the inventors have found that the operation information of a device generated when maintenance, interrupt processing performed by a system administrator and the like are conducted is detected in association with communication anomalies, and thus it is possible to avoid erroneous detection. Consequently, the inventors have conceived monitoring apparatuses and a monitoring method which will be described below.

A monitoring apparatus according to an aspect of the present disclosure includes: a user input acquirer that acquires information based on input provided by a user to an input device; and a communication anomaly detector that detects a communication anomaly in communication that is being observed, and the communication anomaly detector detects the communication anomaly based on information about a packet whose source or destination includes a monitoring target device and the information based on the input corresponding to the packet.

In the monitoring apparatus described above, a communication anomaly is detected based on the information based on the input corresponding to the packet, and thus when a communication anomaly is detected, it is possible to estimate with high accuracy whether the communication is caused by the input (operation) of the user. Hence, the monitoring apparatus can suppress erroneous detection which can be caused by human input. In the monitoring apparatus as described above, it is possible to accurately determine whether there is a high possibility that a communication anomaly has occurred due to malware, a cyberattack, or the like.

For example, the information based on the input may include history information indicating a history of input provided by the user to the input device when the packet is transmitted, and the communication anomaly detector may switch a method for detecting the communication anomaly according to the history information.

In this way, the detection method corresponding to the history information is used, and thus it is possible to suppress erroneous detection which can be caused by human input.

For example, the history information may include information indicating whether input has been provided by the user to the input device when the packet is transmitted, and the communication anomaly detector may switch the method for detecting the communication anomaly according to whether input has been provided by the user to the input device.

In this way, the detection method corresponding to whether the input has been provided by the user to the input device is used, and thus it is possible to suppress erroneous detection which can be caused by human input.

For example, the communication anomaly detector may switch a model for detecting the communication anomaly as the switching of the method for detecting the communication anomaly.

In this way, the model for detecting a communication anomaly is switched, and thus it is possible to suppress erroneous detection which can be caused by human input.

For example, if input has been provided by the user to the input device when the packet is transmitted, the communication anomaly detector does not detect the communication anomaly using the model for detecting the communication anomaly, and if input has not been provided by the user to the input device when the packet is transmitted, the communication anomaly detector may detect the communication anomaly using the model.

In this way, if the input has been provided by the user to the input device when the packet is transmitted, a communication anomaly is not detected, with the result that it is possible to more accurately suppress erroneous detection which can be caused by human input.

For example, the information based on the input may include screen information indicating a display screen of the monitoring target device when the packet is transmitted, and the communication anomaly detector may detect the communication anomaly based on the information about the packet whose source or destination includes the monitoring target device and the screen information corresponding to the packet.

In this way, the screen information corresponding to the packet is used, and thus it is possible to suppress erroneous detection which can be caused by human input.

For example, the communication anomaly detector may detect the communication anomaly based on coordinates and a value of a character string obtained by performing optical character recognition (OCR) on the screen information corresponding to the packet and a value obtained by parsing the packet.

In this way, the value input by the user and the value included in the transmitted packet are used, and thus it is possible to determine whether the packet is generated by the input of the user.

For example, the communication anomaly detector may identify target coordinates on the display screen based on attribute information of the packet, and detect the communication anomaly based on whether a value displayed at the target coordinates identified among coordinates of one or more character strings each being the character string matches the value obtained by parsing the packet.

In this way, when the value input by the user matches the value included in the transmitted packet, it is possible to determine that the packet is generated by the input of the user.

For example, the monitoring apparatus may further include: a communication learner that learns the model based on a predetermined learning period In this way, it is possible to generate the model for detecting an anomaly using the monitoring apparatus.

For example, the communication learner may generate a first list and a second list as the model, the first list is learned based on attribute information of a packet when input is provided by the user to the input device at the time of transmission of the packet during the learning period, and the second list is learned based on attribute information of a packet when input is not provided by the user to the input device at the time of transmission of the packet during the learning period.

In this way, it is possible to generate the two lists for detecting a communication anomaly. The lists as described above are switched, and thus an anomaly is detected, with the result that it is possible to suppress erroneous detection which can be caused by human input.

For example, the communication learner may generate a first machine learning model and a second machine learning model as the model, the first machine learning model is learned by machine learning using, input information that is attribute information of a packet when input is provided by the user to the input device at the time of transmission of the packet during the learning period and, correct answer information that is a detection result indicating normal or anomaly, and the second machine learning model is learned by machine learning using input information that is attribute information of a packet when input is not provided by the user to the input device at the time of transmission of the packet during the learning period and, correct answer information that is a detection result indicating normal or anomaly.

In this way, it is possible to generate the two machine learning models for detecting a communication anomaly. The machine learning models as described above are switched, and thus an anomaly is detected, with the result that it is possible to suppress erroneous detection which can be caused by human input.

For example, the monitoring apparatus may further include: a communication learner that learns, based on a predetermined learning period, a model for identifying the target coordinates on the display screen.

In this way, it is possible to generate the model for detecting an anomaly using the monitoring apparatus.

For example, the model may be a list in which the attribute information of the packet is associated with the target coordinates on the display screen.

In this way, the values of the target coordinates corresponding to the attribute information of the packet are used, and thus it is possible to detect a communication anomaly, with the result that it is possible to more accurately determine whether the packet is generated by the input of the user.

For example, the target coordinates may be coordinates at which a value that matches the value obtained by parsing the packet is displayed on the display screen when a packet is transmitted in the learning period.

In this way, the values of the target coordinates as described above are used, and thus it is possible to detect a communication anomaly, with the result that it is possible to more accurately determine whether the packet is generated by the input of the user.

For example, software that is capable of transferring the information based on the input to the monitoring apparatus may be installed in the monitoring target device, and the user input acquirer acquires the information when the software transfers the information based on the input.

In this way, the software is used, and thus it is possible to easily acquire the information based on the input.

For example, the monitoring apparatus may further include: a transfer device that is connected between the input device and the monitoring target device and that is capable of transferring the information based on the input to the monitoring apparatus, and the user input acquirer may acquire the information when the transfer device transfers the information based on the input.

In this way, hardware is used, and thus it is possible to easily acquire the information based on the input.

For example, the monitoring target device may be a control device for controlling a production facility provided in a factory.

In this way, in a factory in which interrupt processing caused by maintenance or the like easily occurs, it is possible to suppress erroneous detection which can be caused by human input. This can contribute to enhanced productivity in the factory.

A monitoring method according to an aspect of the present disclosure includes: acquiring information based on input provided by a user to an input device; and detecting a communication anomaly based on information about a packet whose source or destination includes a monitoring target device and information based on the input corresponding to the packet.

In this way, the same effects as in the monitoring apparatus described above are achieved.

These general or specific aspects may be realized in a system, a method, an integrated circuit, a computer program, and a non-transitory recording medium such as a computer-readable CD-ROM or may be realized in any combination of a system, a method, an integrated circuit, a computer program, and a recording medium. The program may be previously stored in a recording medium or may be supplied to a recording medium via a wide-area communication network including the Internet.

Specific examples of the monitoring apparatus and the monitoring method according to the aspect of the present disclosure will be described below with reference to drawings. Each of embodiments shown here indicates a specific example of the present disclosure. Hence, numerical values, shapes, constituent elements, the arrangement and connection of the constituent elements, steps, the order of the steps, and the like shown in the following embodiments are examples, and are not intended to limit the present disclosure. Among the constituent elements in the following embodiments, constituent elements which are not recited in the independent claims are described as optionally additional constituent elements.

The drawings are schematic views and are not exactly shown. Hence, for example, scales and the like in the drawings are not necessarily the same. In the drawings, substantially the same configurations are identified with the same reference signs, and repeated description is omitted or simplified.

In the present specification, terms such as matching which indicate relationships between elements, numerical values, and numerical ranges are expressions which not only indicate exact meanings but also indicate substantially equivalent ranges such as a range including a several percent difference (for example, about 10%).

Embodiment

A monitoring apparatus according to an embodiment will be described below. The monitoring apparatus associates communication anomalies with operations performed by a user.

FIG. 1 is an example of a block diagram showing the configuration of control system 1 which uses monitoring apparatus 200 according to the embodiment. FIG. 1 shows an overall configuration of control system 1 in the present embodiment. In the present embodiment, it is assumed that devices communicate with each other using an appropriate protocol on Ethernet specified by IEEE802.3 according to the characteristics of an application such as TCP/IP or UDP/IP.

Constituent elements in FIG. 1 will be described. As shown in FIG. 1, control system 1 includes central monitoring control device 100, user input device 101, personal computer (PC) 110, programmable logic controller (PLC) 120, L2 switch (L2SW) 140, and monitoring apparatus 200. The constituent elements of control system 1 may be, for example, arranged in a factory or at least a part of the constituent elements may be arranged outside the factory.

In a control network (for example, a network in the factory), the devices are connected via L2SW 140. Central monitoring control device 100, PC 110, and PLC 120 can communicate with each other via L2SW 140.

Central monitoring control device 100 is a control device for controlling the constituent elements of control system 1, production facilities (machines), and the like. Central monitoring control device 100 controls the constituent elements, the production facilities, and the like based on input (operation) acquired via user input device 101.

Although a description will be given of central monitoring control device 100 serving as an example of a monitoring target device which is the monitoring target of monitoring apparatus 200, another device which is operated based on input from the user may be the monitoring target of monitoring apparatus 200. As the monitoring target, a plurality of devices may be used.

Central monitoring control device 100 is equipped with user input device 101 such as a mouse or a keyboard. User input device 101 is connected to central monitoring control device 100, and central monitoring control device 100 receives input from the user via user input device 101.

User input device 101 receives input such as maintenance or interrupt processing from the user. User input device 101 may acquire input from the user through a voice, a gesture, or the like.

PC 110 is a device for controlling the production facilities in the factory.

PLC 120 is a device for automatically controlling the production facilities in the factory, and controls the production facilities according to a predetermined order or procedure. Although not shown in the figure, PLC 120 is connected to the production facilities to be able to communicate therewith. PLC 120 can control, for example, a plurality of motors, a plurality of actuators, and the like. An object ID for identification is set for each of the motors and the actuators.

L2SW 140 performs processing for transmitting acquired information to a device corresponding to the information. L2SW 140 includes mirror port 140a. Mirror port 140a is a port which can capture packets flowing on a network switch. Mirror port 140a is also referred to as a monitor port. In L2SW 140, a large number of ports for connecting a local area network (LAN) cable are present, and mirror port 140a copies (mirrors) packets flowing through a specified port. In the present embodiment, monitoring apparatus 200 is connected to mirror port 140a.

Monitoring apparatus 200 monitors whether an anomaly occurs in communication on the control network. Monitoring apparatus 200 acquires entire communication between central monitoring control device 100, PC 110, and PLC 120 from mirror port 140a of L2SW 140 in a promiscuous mode. Monitoring apparatus 200 is connected not only to mirror port 140a but also to a normal port, and can communicate with central monitoring control device 100.

Figure 2:
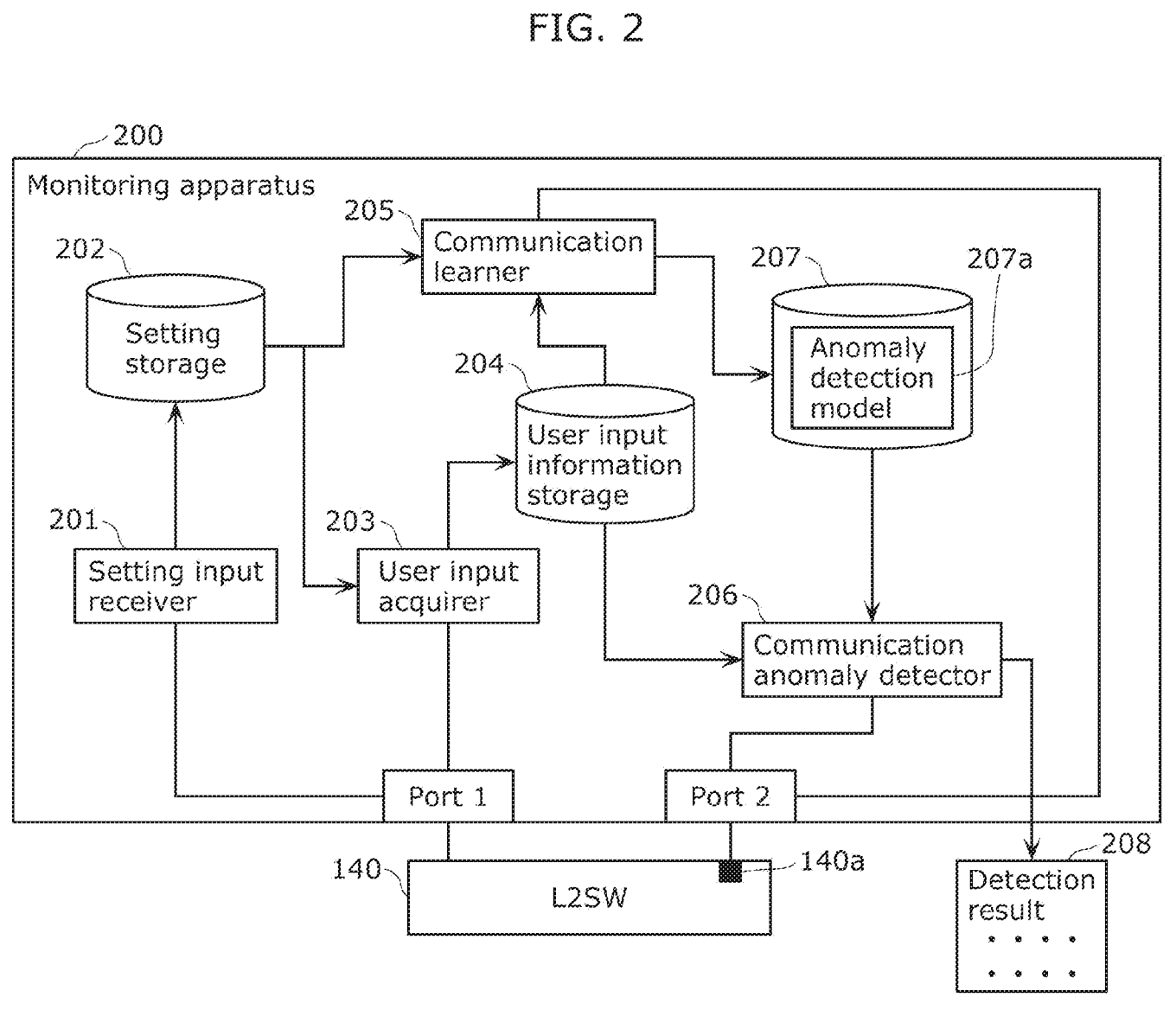

FIG. 2 is a block diagram showing the configuration of monitoring apparatus 200 according to the embodiment.

As shown in FIG. 2, monitoring apparatus 200 includes setting input receiver 201, setting storage 202, user input acquirer 203, user input information storage 204, communication learner 205, communication anomaly detector 206, and anomaly detection model storage 207.

Monitoring apparatus 200 is realized, for example, by a computer device which includes a memory and a processor for executing programs stored in the memory. In this case, the processor of monitoring apparatus 200 executes the programs stored in the memory of monitoring apparatus 200, and thus various types of functions realized by monitoring apparatus 200 are realized.

Setting input receiver 201 receives the setting of a target Internet Protocol (IP) address for monitoring communication, the type of anomaly detection algorithm utilized, setting information such as a learning period and a relearning frequency, and the like by file uploading or the like via port 1 (first port), and stores them in setting storage 202.

Setting storage 202 is a storage device which stores information acquired via setting input receiver 201. Setting storage 202 stores the setting of the target IP address for monitoring communication, the type of anomaly detection algorithm utilized, the setting information such as the learning period and the relearning frequency, and the like. Although setting storage 202 is realized, for example, by a semiconductor memory, the present embodiment is not limited to this configuration. The information stored in setting storage 202 will be described below with reference to FIGS. 3 and 4.

FIG. 3 is a diagram showing setting information on communication monitoring target IP addresses stored in setting storage 202 in the embodiment. FIG. 4 is a diagram showing setting information for anomaly detection algorithms utilized and stored in setting storage 202 in the embodiment.

As shown in FIG. 3, the setting information on communication monitoring target IP addresses is a list of communication monitoring target IP addresses which are the IP addresses of targets whose communication is monitored. In the example in FIG. 3, three IP addresses are listed but the number of IP addresses is not particularly limited, and one or more addresses may be used.

As shown in FIG. 4, the setting information for anomaly detection algorithms is a list in which the anomaly detection algorithm, ON/OFF, the learning period, the relearning frequency, and model switching depending on user input for the most recent N seconds are associated with each other. The ON/OFF, the learning period, the relearning frequency, and the model switching depending on user input for the most recent N seconds are examples of parameters.

The anomaly detection algorithm indicates the type of algorithm, and examples thereof include a control command WL (white list) algorithm, a maximum value/minimum value WL algorithm, and a payload string anomaly detection algorithm.

The ON/OFF indicates whether the corresponding algorithm is used to detect a communication anomaly. A check means ON, and in the example in FIG. 4, the control command WL algorithm and the maximum value/minimum value WL algorithm are ON.

The learning period indicates a period during which a model (anomaly detection model) used for anomaly detection is learned.

The relearning period indicates a period during which the model is relearned. For example, in the control command WL algorithm, relearning is performed every 7 days using information accumulated for 14 days.

The model switching depending on user input for the most recent N seconds indicates whether the model used for anomaly detection is switched depending on whether the user provides input to user input device 101 for the most recent N seconds after the time when communication is observed. In the example in FIG. 4, the control command WL algorithm indicates that the model is switched depending on whether the user provides input to user input device 101 for the most recent 5 seconds after the time when communication is observed, and the maximum value/minimum value WL algorithm indicates that the same model is used (the model is not switched) regardless of whether the user provides input to user input device 101 most recently after the time when communication is observed.

N (seconds) is not limited to 5 (seconds), and may be, for example, any period within 300 (seconds). For example, N is previously set by the user or the like.

With reference back to FIG. 2, the description of monitoring apparatus 200 will be continued.

User input acquirer 203 acquires information based on input provided by the user to user input device 101. User input acquirer 203 monitors information related to the user input of central monitoring control device 100, and stores the information in user input information storage 204. Specifically, user input acquirer 203 operates a key logger on central monitoring control device 100, sequentially receives keystroke information obtained from the key logger, information of a screen which is captured, time information therefor, and the like, and stores them in user input information storage 204. The operation of the key logger may be started up by directly operating central monitoring control device 100 or may be started up by accessing central monitoring control device 100 from monitoring apparatus 200 by a Secure SHell (SSH) or the like. The key logger is a generic term for software for recording the details of an operation on user input device 101, and, in the present embodiment, is software capable of transferring the information input to user input device 101 to monitoring apparatus 200.

User input information storage 204 stores the information which is acquired by user input acquirer 203 and is based on the input provided by the user to user input device 101. User input information storage 204 stores, for example, at least one of key input information (see FIG. 5) described later or screen information (see FIGS. 6A to 6D). Although user input information storage 204 is realized, for example, by a semiconductor memory, the present embodiment is not limited to this configuration.

FIG. 5 is a diagram showing the key input information obtained by monitoring apparatus 200 according to the embodiment from the key logger operated in central monitoring control device 100.

As shown in FIG. 5, the key logger is used, and thus monitoring apparatus 200 can acquire the key input information which includes key information input by the user in central monitoring control device 100 and an input time. The key input information includes information indicating whether the input has been provided by the user to user input device 101 when a packet is transmitted. The key input information is history information (chronological information) which indicates the history of the key information input by the user. The key information is the history of operations of user input device 101 and the like. The history information includes the history of the input provided by the user to user input device 101 when the packet is transmitted. For example, the example in FIG. 5 indicates that a key input of "pws" was performed at 9:01:01 on Jan. 10, 2020. The information based on the input may include the history information as described above.

The time when the packet is transmitted means a predetermined width of time which includes a time at which the packet is transmitted. With respect to a first time at which the packet is transmitted, the time when the packet is transmitted may be a time between the first time and a second time which is a predetermined time ahead of the first time or may be a predetermined time period around the first time. Although the predetermined time period is, for example, less than or equal to 300 seconds, the predetermined time period is not limited to this range. For example, the time when the packet is transmitted may be a predetermined width of time that includes a time at which the packet is observed in L2SW 140 or monitoring apparatus 200.

FIGS. 6A to 6D are diagrams showing examples of the screen information obtained by monitoring apparatus 200 according to the embodiment from the key logger operated in central monitoring control device 100. The screen information indicates the display screen of central monitoring control device 100 when the packet is transmitted. The screen information may be, for example, information obtained by the screen shot of the display screen of central monitoring control device 100. The screen information displays information (for example, a value input by the user when the user provides the input) corresponding to the input provided by the user to user input device 101.

Figure 6A:
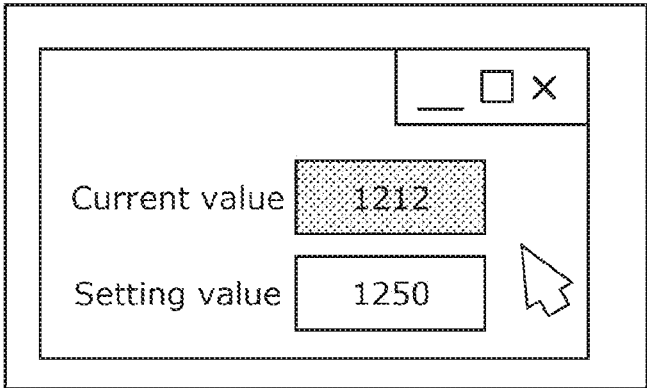
FIG. 6A is a diagram showing a first example of screen information obtained by the monitoring apparatus according to the embodiment from the key logger operated in the central monitoring control device.
Figure 6B:
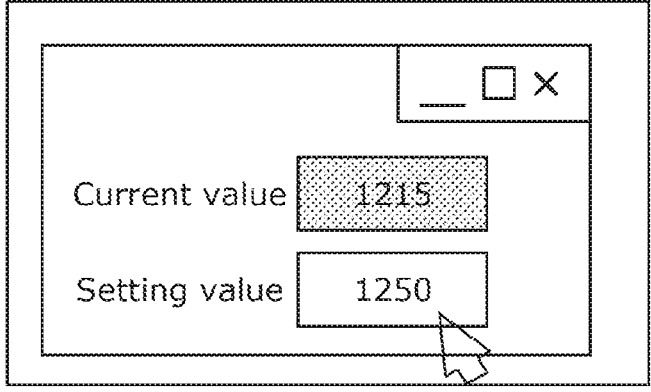
FIG. 6B is a diagram showing a second example of the screen information obtained by the monitoring apparatus according to the embodiment from the key logger operated in the central monitoring control device.
Figure 6C:
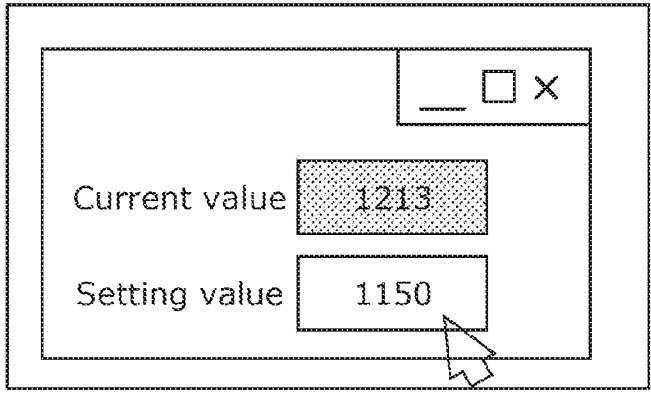
FIG. 6C is a diagram showing a third example of the screen information obtained by the monitoring apparatus according to the embodiment from the key logger operated in the central monitoring control device.
Figure 6D:
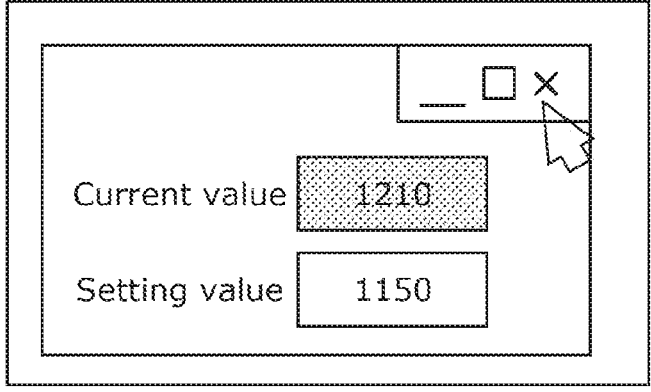
FIG. 6D is a diagram showing a fourth example of the screen information obtained by the monitoring apparatus according to the embodiment from the key logger operated in the central monitoring control device.

FIGS. 6A and 6B show screen information which has a common setting value of 1250 and different current values. FIGS. 6C and 6D show screen information which has a common setting value of 1150 and different current values. As shown in FIGS. 6A to 6D, the screen information includes time information. FIGS. 6A to 6D show, for example, chronological data of the screen information.

As shown in FIGS. 6A to 6D, the key logger is used, and thus monitoring apparatus 200 can acquire the screen information of central monitoring control device 100 and the time information of the time at which the screen is displayed.

User input acquirer 203 uses software such as the key logger to acquire the key input information of the user shown in FIG. 5 or the screen information of the user shown in FIG. 6A, FIG. 6B, FIG. 6C, or FIG. 6D, and stores them in user input information storage 204. In the present embodiment, user input acquirer 203 may acquire at least the key input information of the user shown in FIG. 5.

As described above, in central monitoring control device 100 serving as the monitoring target device, the software capable of transferring, to monitoring apparatus 200, the information based on the input provided to user input device 101 is installed, and the software transfers the information based on the input, with the result that user input acquirer 203 acquires the information based on the input. A method for acquiring, by user input device 101, the information based on the input provided to user input device 101 is not limited to the method described above.

For example, a transfer device (not shown) may be provided which is connected between user input device 101 and central monitoring control device 100 and can transfer the information based on the input provided by the user to user input device 101, and the transfer device may transfer the information based on the input such that user input acquirer 203 acquires the information based on the input.

Communication learner 205 performs, based on the information which is set, learning on communication acquired from mirror port 140a, and stores, in anomaly detection model storage 207, anomaly detection model 207a which has been learned. Communication learner 205 learns (generates) anomaly detection model 207a based on the learning period (see FIG. 4) which is previously set for each of the types of anomaly detection algorithms. In the present embodiment, communication learner 205 generates, as anomaly detection model 207a, lists as shown in FIGS. 8A and 8B which will be described later.

Communication anomaly detector 206 detects a communication anomaly in communication which is being observed. Communication anomaly detector 206 detects the communication anomaly based on information about a packet whose source (transmission source) or destination (transmission destination) includes central monitoring control device 100 and information (for example, the history information) based on input corresponding to the packet. When a specified detection start time is reached, communication anomaly detector 206 uses an anomaly detection model to detect a communication anomaly in the monitoring target, and thereby outputs detection result 208 as shown in FIG. 7.

FIG. 7 is a diagram showing detection result 208 output by communication anomaly detector 206 in the embodiment.

As shown in FIG. 7, detection result 208 is a table in which a time, a source IP, a destination IP, a command, most recent user input, and the degree of anomaly are associated with each other.

The time indicates a time at which the packet was observed. In other words, the time indicates a time at which communication was performed.

The source IP indicates the IP address of the source of the packet, and the destination IP indicates the IP address of the destination of the packet.

The command indicates an instruction to cause a device having the destination IP to perform execution. Although examples of the command include "write (writing)" and "read (reading)", the command is not limited to them.

The most recent user input indicates, when the input has been provided by the user to user input device 101 most recently after the packet is observed, the time at which the input was provided. The first row of detection result 208 indicates that the input was provided by the user to user input device 101 one second before the packet was observed, and the second row of detection result 208 indicates that the input was not provided by the user to user input device 101 most recently (for example, the most recent 5 seconds) after the packet was observed. In the first row of detection result 208, the input provided by the user to user input device 101 at 9:20:12 on Jan. 10, 2020 corresponds to the packet observed at 9:20:13 on Jan. 10, 2020.

The degree of anomaly indicates the degree of communication anomaly. For example, the upper limit of the degree of anomaly is 100, and as the degree of anomaly is closer to 100, the degree of anomaly is higher.

Anomaly detection model storage 207 stores one or more anomaly detection models 207a generated by communication learner 205. Although anomaly detection model storage 207 is realized, for example, by a semiconductor memory, the present embodiment is not limited to this configuration.

FIGS. 8A and 8B each are diagrams showing a control command white list which is one type of anomaly detection model 207a. FIG. 8A shows a control command white list when the input has not been provided by the user most recently, and FIG. 8B shows a control command white list when the input has been provided by the user most recently. The control command white list is, for example, a model which is used when a communication anomaly is detected by the control command WL algorithm.

As shown in FIGS. 8A and 8B, the control command white list is a list in which the source IP, the destination IP, and an observation command are associated with each other. In anomaly detection using the control command white list, the tuple of the source IP, the destination IP, and the observation command observed in the learning period is previously held, and when a tuple which is not included in the white list is observed, anomaly communication is detected.

In the control command WL algorithm in the setting information described with reference to FIG. 4, the "model switching depending on user input for the most recent N seconds" is ON, and thus learning is performed for each of a model when the input has been provided by the user most recently and a model when the input has not been provided by the user most recently, with the result that the models of both patterns are shown in FIGS. 8A and 8B.

FIG. 9 is a diagram showing a maximum value/minimum value white list which is one type of anomaly detection model 207*a*. The control command white list is, for example, a model which is used when a communication anomaly is detected by the maximum value/minimum value WL algorithm.

As shown in FIG. 9, the control command white list is a list in which a device IP, the object ID, and maximum value/minimum value are associated with each other. The device IP is, for example, the destination IP. The object ID is identification information for identifying a specific object from a plurality of objects connected to a device (for example, PLC 120) having the device IP. The maximum value/minimum value is the standard value of a control value.

In anomaly detection using the maximum value/minimum value white list, the device IP observed in the learning period and the maximum value and the minimum value of values which have been observed as the value of the object ID inside the device are previously stored, and when a value which does not fall in the range of the values stored as the value of the object ID is observed, anomaly communication is detected. In the maximum value/minimum value WL algorithm in the screen information shown in FIG. 4, the "model switching depending on user input for the most recent N seconds" is OFF, and thus the model is not changed depending on whether the input has been provided by the user most recently, with the result that one model is shown in FIG. 9.

Communication learner 205 performs learning on the control command white list and the like shown in FIG. 8A, FIG. 8B, or FIG. 9, and communication learner 205 detects, as an anomaly, communication which deviates from the behavior which has been learned.

Anomaly detection model 207*a* may be a black list instead of the white list. In other words, anomaly detection model 207*a* may be a list which can detect, as an anomaly, communication that matches the learned behavior.

Figure 10:
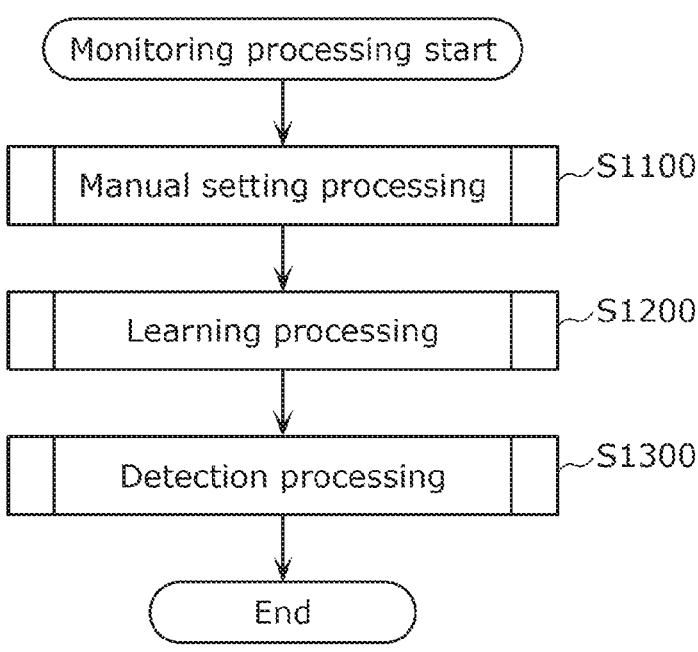
FIG. 10 is a flowchart showing an overview of processing of the monitoring apparatus according to the embodiment.

FIG. 10 is a flowchart showing an overview of processing of monitoring apparatus 200 according to the embodiment.

As shown in FIG. 10, in the processing of monitoring apparatus 200, processing for manually performing setting (manual setting processing) (S1100) is first performed, then learning processing (S1200) is performed, and detection processing (S1300) is finally performed. However, these processing steps do not necessarily need to be performed in this order. During or after the learning processing (S1200), the manual setting processing (S1100) may be performed again or after the detection processing (S1300), the learning processing (S1200) may be performed again.

Figure 11:
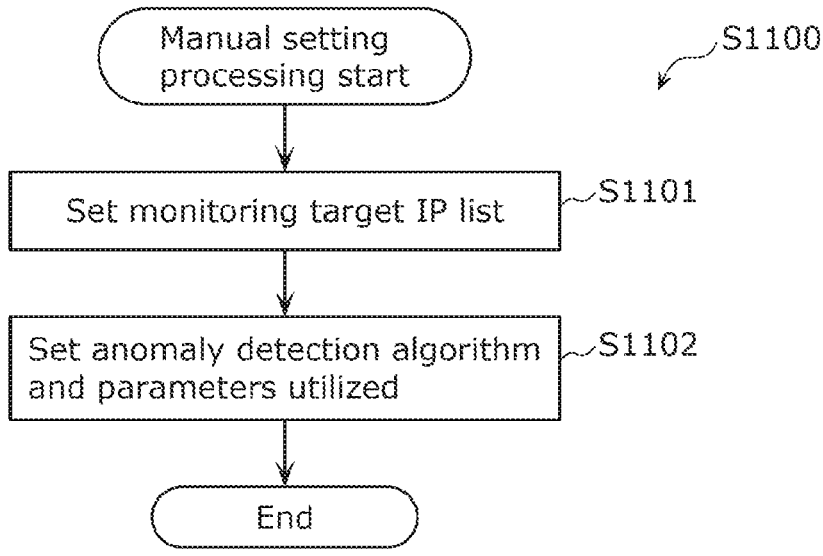
FIG. 11 is a flowchart showing manual setting processing of the monitoring apparatus according to the embodiment.

FIG. 11 is a flowchart showing the manual setting processing (S1100) of monitoring apparatus 200 according to the embodiment.

As shown in FIG. 11, in the manual setting processing, setting input receiver 201 first performs the setting (S1101) of a monitoring target IP address list shown in FIG. 3, and user input acquirer 203 then performs the setting (S1102) of the anomaly detection algorithm and parameters utilized and shown in FIG. 4.

In step S1101, for example, setting input receiver 201 receives, from the user, the input of the IP addresses of one or more monitoring target devices, generates setting information including the received IP addresses, and stores the setting information in setting storage 202.

In step S1102, for example, setting input receiver 201 receives, from the user, the setting of the anomaly detection algorithm and parameters utilized, generates setting information including the anomaly detection algorithm and parameters received, and stores the setting information in setting storage 202.

The information set in the manual setting processing (S1100) is not necessarily limited to only the monitoring target IP addresses and the anomaly detection algorithm and parameters utilized, and in step S1100, the setting of the type of monitoring target command and the threshold value of the degree of anomaly which is output as an alert and the like may be further performed.

FIG. 12 is a flowchart showing the learning processing of monitoring apparatus 200 according to the embodiment. FIG. 12 shows the learning processing performed by communication learner 205 of monitoring apparatus 200 according to the embodiment.

As shown in FIG. 12, in the learning processing, communication learner 205 first reads, from setting storage 202, the information of the anomaly detection algorithm utilized (S1201). In this step, for each anomaly detection algorithm utilized, necessary information for the learning such as parameters needed for the learning of the algorithm and whether the model needs to be switched depending on whether the input has been provided by the user is extracted. Step S1201 is performed by reading the setting information shown in FIG. 4 from setting storage 202.

The actual learning processing is then performed. Monitoring apparatus 200 acquires a learning target packet via mirror port 140*a* of L2SW 140 connected to port 2 (second port) in FIG. 2 (step S1202). The learning target packet is a packet in communication which is observed in the learning period.

In order to perform learning on each learning target packet in all the anomaly detection algorithms, communication learner 205 starts learning in the target anomaly detection algorithm (S1203).

Communication learner 205 reads the setting information of the target anomaly detection algorithm from setting storage 202, and determines, in the anomaly detection algorithm, whether the model switching depending on user input for the most recent N seconds is ON or OFF (S1204).

When the model switching depending on user input for the most recent N seconds is OFF (no in S1204), the model switching is not performed, and thus communication learner 205 performs learning on a base model as it is (S1207). Although the base model is the anomaly detection model (no most recent user input model) which is learned using a packet when the input has not been provided by the user most recently as the learning target packet, the base model may be the anomaly detection model which is learned using a packet acquired in the learning period as the learning target packet regardless of whether the input has not been provided by the user most recently.

When the model switching depending on user input for the most recent N seconds is ON (yes in S1204), communication learner 205 acquires the input provided by the user for N seconds before the time at which the packet is observed (S1205).

In the user input, the key input information of the user shown in FIG. 5 or the screen information shown in FIG. 6A, FIG. 6B, FIG. 6C, or FIG. 6D is acquired through the key logger installed in central monitoring control device 100 of the monitoring target. The key input information or the screen information is associated with the time information.

Then, based on the key input information or the screen information, communication learner 205 determines whether the input has been provided by the user for N seconds therebefore (S1206).

When communication learner 205 determines that the input has not been provided by the user (no in S1206), communication learner 205 learns the base model (no most recent user input model) (S1207), and when communication learner 205 determines that the input has been provided by the user (yes in S1206), communication learner 205 learns the most recent user input model (S1208).

In step S1207, the attribute information of the packet in which the input is determined not to be provided by the user is used, and thus the base model is learned. Specifically, the attribute information of the packet observed in step S1202 is added to the control command white list as shown in FIG. 8A.

In step S1208, the attribute information of the packet in which the input is determined to be provided by the user is used, and thus the most recent user input model is learned. Specifically, the attribute information of the packet observed in step S1202 is added to the control command white list as shown in FIG. 8B.

As described above, communication learner 205 generates two anomaly detection models, that is, the control command white list (anomaly detection model) generated by the packet in which the input has been provided by the user for the most recent N seconds and the control command white list (anomaly detection model) generated by the packet in which the input has not been provided by the user for the most recent N seconds. Communication learner 205 is also said to generate: the control command white list (an example of a first list) as shown in FIG. 8B which is generated based on the attribute information of a packet if the input has been provided by the user to user input device 101 when the packet is transmitted in the learning period; and the control command white list (an example of a second list) as shown in FIG. 8A which is generated based on the attribute information of a packet if the input has not been provided by the user to user input device 101 when the packet is transmitted in the learning period.

Then, communication learner 205 determines whether an unlearned anomaly detection algorithm (anomaly detection algorithm which has not been learned on the learning target packet) is present (S1209), and when an unlearned anomaly detection algorithm is present (yes in S1209), step S1203 is performed on the target anomaly detection algorithm. When an anomaly detection algorithm which has not been learned on the learning target packet is not present (no in S1209), that is, when the learning of all the anomaly detection algorithms on the learning target packet is completed, communication learner 205 determines whether the subsequent learning target packet is present (S1210). Here, when the subsequent learning target packet is present (yes in S1210), communication learner 205 performs step S1202. When the subsequent learning target packet is not present (no in S1210), that is, when the learning on all the learning target packets is completed, communication learner 205 stores all the anomaly detection models (S1211) and completes the learning processing.

Figure 13:
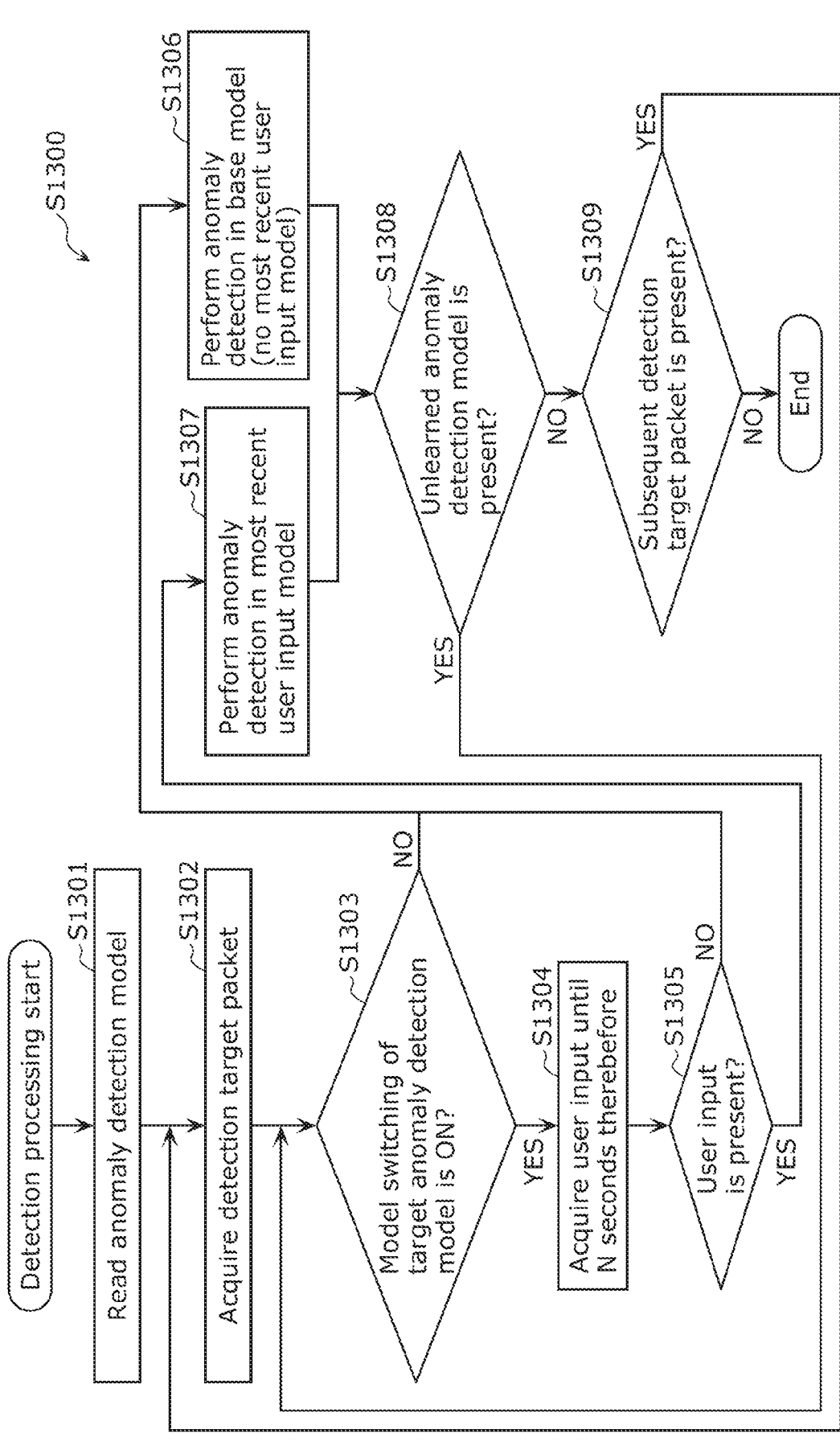
FIG. 13 is a flowchart showing the detection processing of the monitoring apparatus according to the embodiment.

Then, the processing for anomaly detection using the anomaly detection model generated as described above will be described with reference to FIG. 13. FIG. 13 is a flowchart showing the detection processing (S1300) of monitoring apparatus 200 according to the embodiment.

FIG. 13 is a flowchart showing the detection processing performed by communication anomaly detector 206 of monitoring apparatus 200.

As shown in FIG. 13, in the detection processing, communication anomaly detector 206 first reads, from the setting information, the information of the anomaly detection algorithm utilized so as to read anomaly detection model 207a (S1301).

Then, communication anomaly detector 206 performs the actual detection processing. Communication anomaly detector 206 acquires a detection target packet via mirror port 140a of L2SW 140 connected to port 2 (S1302).

Communication anomaly detector 206 determines, based on the setting information shown in FIG. 4, whether the target anomaly detection model is a model which performs the model switching depending on user input for the most recent N seconds (S1303).

When the model switching depending on user input for the most recent N seconds is OFF (no in S1303), the model switching is not performed, and thus communication anomaly detector 206 uses the base model to perform anomaly detection (S1306). The base model is, for example, the no most recent user input model (for example, the control command white list shown in FIG. 8A).

When the model switching depending on user input for the most recent N seconds is ON (yes in S1303), communication anomaly detector 206 acquires the input provided by the user for N seconds before the time at which the detection target packet is acquired (S1304).

The key input information of the user shown in FIG. 5 or the screen information shown in FIG. 6A, FIG. 6B, FIG. 6C, or FIG. 6D is received through the key logger installed in central monitoring control device 100 of the monitoring target, and thus the input provided by the user is obtained. The key input information or the screen information is associated with the time information.

Communication anomaly detector 206 determines whether the input has been provided by the user for N seconds therebefore (S1305). For example, communication anomaly detector 206 determines whether the input has been provided by the user between the time at which the detection target packet is acquired and a time which is N seconds before the time by using the key input information shown in FIG. 5.

When communication anomaly detector 206 determines that the input has not been provided by the user (no in S1305), communication anomaly detector 206 performs anomaly detection in the no most recent user input model (S1306), and when communication anomaly detector 206 determines that the input has been provided by the user (yes in S1305), communication anomaly detector 206 performs anomaly detection in the most recent user input model (S1307).

When in step S1306, the attribute information of the detection target packet matches any one in the control command white list shown in FIG. 8A, communication anomaly detector 206 determines normal, and when the attribute information of the detection target packet does not match any in the control command white list shown in FIG. 8A, communication anomaly detector 206 determines an anomaly. When in step S1307, the attribute information of the detection target packet matches any one in the control command white list shown in FIG. 8B, communication anomaly detector 206 determines normal, and when the attribute information of the detection target packet does not match any in the control command white list shown in FIG. 8B, communication anomaly detector 206 determines an anomaly.

As described above, communication anomaly detector 206 switches the method for detecting a communication anomaly based on the history information. In the example in FIG. 13, communication anomaly detector 206 switches the method for detecting a communication anomaly according to whether the input has been provided by the user to user input device 101. The switching of the detection method is realized, for example, by switching the anomaly detection model used for detection. When the input has been provided by the user to user input device 101, communication anomaly detector 206 switches the anomaly detection model used for detection regardless of the details of the input provided by the user. In other words, the anomaly detection model is determined regardless of the details of the input provided by the user.

When an anomaly is detected in step S1306 or step S1307, communication anomaly detector 206 outputs detection result 208 (see FIG. 7). When no anomaly is detected in step S1306 or step S1307, communication anomaly detector 206 may output a detection result indicating normal.

Then, communication anomaly detector 206 determines whether the anomaly detection algorithm in which anomaly detection is not performed on the detection target packet is present (S1309), and when the anomaly detection algorithm is present (yes in S1308), communication anomaly detector 206 performs step S1303 again on the target anomaly detection algorithm. When the anomaly detection algorithm in which anomaly detection is not performed on the detection target packet is not present (no in S1308), that is, when the anomaly detection of the detection target packet on all the anomaly detection algorithms is completed, communication anomaly detector 206 determines whether the subsequent detection target packet is present (S1309). When the subsequent detection target packet is present (yes in S1309), communication anomaly detector 206 performs step S1302 again. When the subsequent detection packet is not present (no in S1309), that is, when anomaly detection on all the detection target packets is determined to be completed, communication anomaly detector 206 completes the detection processing.

Variation 1 of Embodiment

Figure 14:
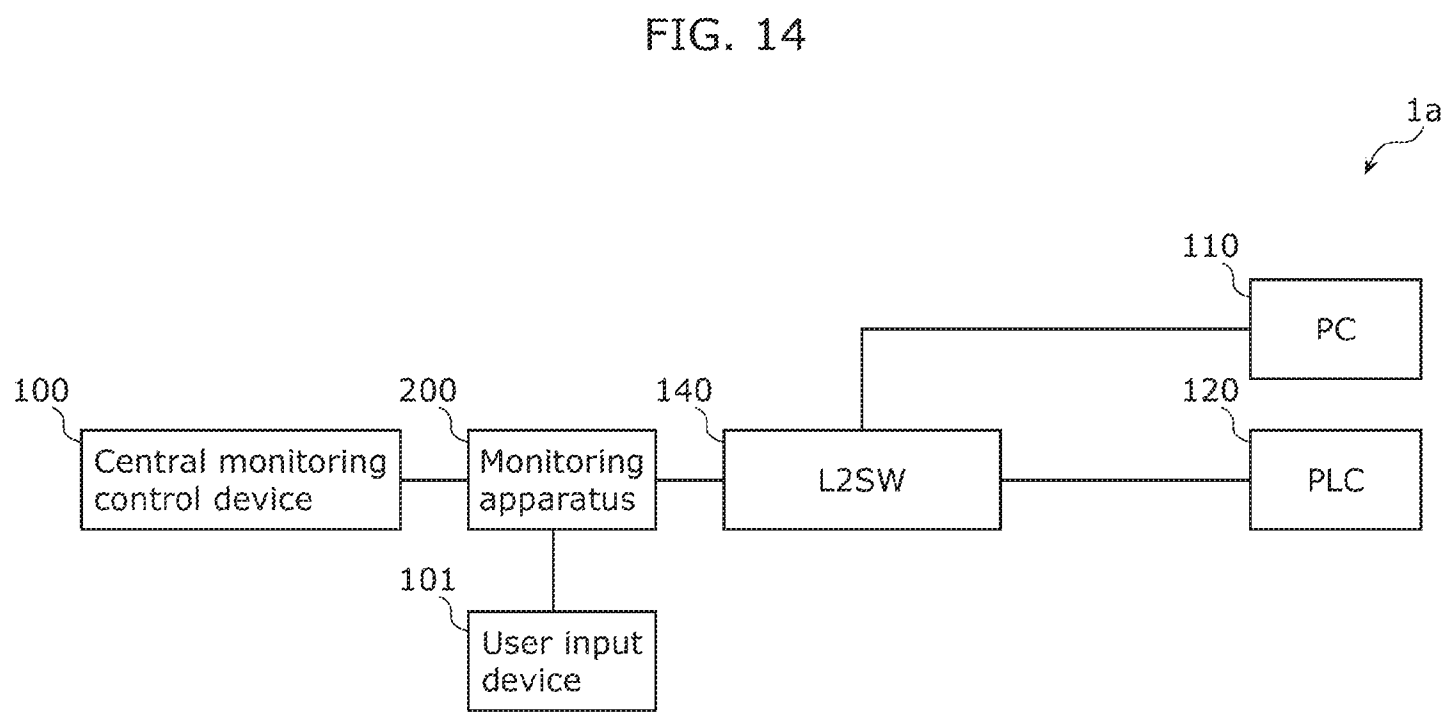

Although in the embodiment described above, the example is described where monitoring apparatus 200 uses the key logger or the like to acquire the input provided by the user in central monitoring control device 100 via a network, the method for acquiring the input provided by the user is not limited to this method. In the present variation, a configuration in which monitoring apparatus 200 directly acquires the input provided by the user from user input device 101 will be described with reference to FIG. 14. FIG. 14 is a block diagram showing the configuration of control system 1a which uses monitoring apparatus 200 according to Variation 1 of the embodiment.

As shown in FIG. 14, user input device 101 may be directly connected to monitoring apparatus 200, and the input provided by the user may be transmitted to central monitoring control device 100 via monitoring apparatus 200. Monitoring apparatus 200 is directly connected, for example, to central monitoring control device 100, user input device 101, and L2SW 140. In this case, monitoring apparatus 200 can directly receive the keystroke information, the mouse operation information, and the like of the user.

Variation 2 of Embodiment

Although in the embodiment described above, the example is described where anomaly detection is performed by determining only whether the input has been provided by the user, anomaly detection may be performed using the details of the input provided by the user. In the present variation, a monitoring method for performing anomaly detection using the details of the input provided by the user will be described with reference to FIGS. 15 to 20. A learning method and a detection method in the present variation are different from the learning processing and the detection processing in the embodiment.

In the present variation, communication anomaly detector 206 detects a communication anomaly based on information about a packet whose source or destination includes central monitoring control device 100 and screen information corresponding to the packet. For example, communication anomaly detector 206 detects a communication anomaly based on the coordinates and the value of a character string obtained by performing OCR on the screen information and a value obtained by parsing communication which is observed. A description will be given below with reference to drawings.

The screen information corresponding to the packet is information indicating a display screen on which the packet is generated based, and is information indicating details displayed on the display screen when the packet is transmitted.

FIG. 15 is a flowchart showing learning processing (S1200a) of a monitoring apparatus according to Variation 2 of the embodiment. FIG. 15 shows a method for generating an anomaly detection model for detecting an anomaly by utilizing the information of the screen which is changed by the input provided by the user. FIG. 16 is a diagram showing an example of data obtained by parsing a control packet (packet).

In the present variation, as the processing of monitoring apparatus 200, instead of the learning processing (S1200) shown in FIG. 10, the learning processing (S1200a) is performed, and instead of the detection processing (S1300), detection processing (S1300a described later and shown in FIG. 20) is performed. The constituent elements of a control system in the present variation may be the same as those of control system 1 in the embodiment, and in the following description, the constituent elements of control system 1 are used.

As shown in FIG. 15, communication learner 205 first observes all communication, thereafter performs communication parsing processing, and acquires one row of a communication parsing result thereof (S1401). The communication parsing processing is processing for performing field analysis on the packet to identify what type of information is communicated. The acquiring of one row of the communication parsing result means that a communication parsing result in a piece of communication (for example, a result in each row shown in FIG. 16) is acquired.

As shown in FIG. 16, the parsing result includes information such as a time, a source IP, a destination IP, a command, an object ID, and a current value.

The time indicates a time at which the packet was observed. The source IP and the destination IP are pieces of information which can be obtained by analyzing the header portion of the packet. The command, the object ID, and the current value are pieces of information which can be obtained by analyzing the data portion of the packet. The current value indicates a value such as a control value or a sensor value which is input by the user to user input device 101. In step S1401, the result in the lowermost row of the three rows (the result whose time is 2020 Jan. 19 9:25:45) is assumed to be acquired.

With reference back to FIG. 15, communication learner 205 then acquires an input screen information group at times around (for example, 5 seconds before and after) a target pursing result (S1402). For example, communication learner 205 acquires the screen information for 5 seconds before and after 9:25:45 on Jan. 19, 2020 from central monitoring control device 100 via software such as the key logger. The number of pieces of screen information included in 5 seconds before and after the target pursing result is not particularly limited. For example, although in step S1402, a plurality of pieces of screen information at predetermined time intervals in 5 seconds before and after the target pursing result are acquired, for example, one piece of screen information may be acquired.

Then, communication learner 205 performs optical character recognition (OCR) on all the screen information group acquired to acquire numerical information and its position information displayed on the screen (S1403). The position information indicates coordinates on the display screen.

FIG. 17 is a diagram showing text information obtained when OCR is performed with the screen information set to input.

As shown in FIG. 17, the OCR result is obtained in a form in which the starting point coordinates of rectangles and the text information correspond to each other. FIG. 17 shows an example where symbols of "□x" are displayed in a rectangle with the starting point coordinates of x=1053, y=128 on the screen, characters of "current value" are displayed in a rectangle with the starting point coordinates of x=210, y=418 on the screen, a value of "1212" is displayed in a rectangle with the starting point coordinates of x=659, y=418 on the screen, characters of "setting value" are displayed in a rectangle with the starting point coordinates of x=210, y=724 on the screen, and a number of "1250" is displayed in a rectangle with the starting point coordinates of x=659, y=724 on the screen.

Then, communication learner 205 extracts all the information of a "current value" string described in the communication parsing result and the position information of data whose numerical values match each other in the entire screen information obtained by OCR, and associates them as value matching OCR coordinates with the rows of the communication parsing result (S1404). Communication learner 205 associates numerical values included in the communication parsing result with information indicating in which positions on the screen the numerical values are displayed. The matching of the numerical values may include not only the complete matching of the numerical values but also the numerical values falling in a predetermined range. The value matching OCR coordinates indicate coordinates at which on the display screen when the packet is transmitted in the learning period, a value matching a value obtained by parsing the communication is displayed, and the value matching OCR coordinates are an example of target coordinates.

The coordinates in the OCR result which match the current value of 1250 in the third row in FIG. 16 are x=659, y=724. The coordinates of the numerical value of 1212 in the OCR result which are in a predetermined range with respect to the current value of 1250 in the third row in FIG. 16 are x=659, y=418. The coordinates of the OCR result which are associated with the current value of 1250 in the third row in FIG. 16 are x=210, y=724 and x=659, y=418.

FIG. 18 is a diagram showing an example of data in which the text information obtained by performing OCR on the screen information is associated with the data obtained by parsing the control packet.

As shown in FIG. 18, the result obtained by the association is data in which the item of the value matching OCR coordinates is added to the data shown in FIG. 16. Here, x=659, y=724 and x=659, y=418 are associated as the value matching OCR coordinates with the communication parsing result in the third row. As described above, for example, a plurality of coordinates may be associated with one row.

With reference back to FIG. 15, communication learner 205 determines whether the subsequent communication parsing result is present (S1405). When the subsequent communication parsing result is present (yes in S1405), communication learner 205 performs the processing in step S1401 on the subsequent communication parsing result.

When the subsequent communication parsing result is not present (no in S1405), that is, when the association is performed on all the communication parsing results, communication learner 205 extracts the entire set of the communication parsing results including coordinate information in which the value matching OCR coordinates are the same or all x coordinates and y coordinates are very close to each other so as to fall in a predetermined range (for example, a range of ±3) in the communication parsing results in which all pieces of attribute information (such as the source IP, the destination IP, the command, and the object ID) match each other (S1406). In the example in FIG. 18, in the first and third rows, the source IP is "192.168.1.101", the destination IP is "192.168.1.102", the command is "write", and the object ID is "analog output 101" and the value matching OCR coordinates hold the same coordinates (x=659, y=724). Hence, in step S1406, the pieces of attribute information appearing in the first and third rows (the source IP is "192.168.1.101", the destination IP is "192.168.1.102", the command is "write", and the object ID is "analog output 101") and the value matching OCR coordinates (x=659, y=724) are output.

Then, communication learner 205 also extracts the entire set of the communication parsing results in which the other pieces of attribute information except one piece of attribute information among the pieces of attribute information (such as the source IP, the destination IP, the command, and the object ID) match each other and the value matching OCR coordinates are the same as or close to each other (S1407). The processing in step S1407 may be performed, for example, on results other than the results of the extraction in step S1406 in the data shown in FIG. 18. For example, in the processing in step S1407, results (for example, the first row shown in FIG. 19 described later) which are in a relationship of inclusion with the attribute information extracted in step S1406 do not need to be extracted.

Then, communication learner 205 outputs the results of the extraction in steps 1406 and S1407 as the anomaly detection model (S1408).

FIG. 19 is a diagram showing an example of the anomaly detection model in Variation 2 of the embodiment. Here, "***" in FIG. 19 means that its attribute information is not particularly limited. For example, the first row in FIG. 19 indicates the value matching OCR coordinates of the anomaly detection model in which attributes other than the object ID match each other, that is, the communication parsing result extracted in step S1407. The second and third rows in FIG. 19 indicate the value matching OCR coordinates of the result in which all the four attributes match each other, that is, the communication parsing result extracted in step S1406.

As shown in FIG. 19, the anomaly detection model is information in which the attribute information (here, the source IP, the destination IP, the command and the object ID) is associated with the value matching OCR coordinates. In other words, the anomaly detection model does not include numerical values such as the current value and the setting value.

In the first and second rows shown in FIG. 19, the attribute information has a relationship of inclusion. In this case, preference is given to the row in which a larger number of pieces of attribute information match each other. In other words, in the first and second rows shown in FIG. 19, preference is given to the second row. For example, the information in the first row shown in FIG. 19 does not need to be included in the anomaly detection model.

Although in the above description, as the attribute information, the source IP, the destination IP, the command, and the object ID are mentioned, attribute information other than those may be included. Although the example is described where when up to three pieces of attribute information match each other, the extraction is performed, the present variation is not limited to this configuration, and for example, when at least one of pieces of attribute information match each other, the extraction may be performed.

As described above, communication learner 205 in the present variation learns, based on the predetermined learning period, the anomaly detection model for identifying the target coordinates on the display screen.

Then, a method for detecting an anomaly using the anomaly detection model generated as described above will be described with reference to FIG. 20. FIG. 20 is a flowchart showing the detection processing (S1300a) of monitoring apparatus 200 according to Variation 2 of the embodiment.

In the detection processing shown in FIG. 20, communication anomaly detector 206 first observes all the communication, thereafter performs the communication parsing processing, and acquires one row of its communication parsing result (S1501).

Then, communication anomaly detector 206 determines whether the acquired communication parsing result matches a combination of pieces of attribute information of the anomaly detection model extracted in the learning processing (S1502).

When the acquired communication parsing result does not match any combination of pieces of attribute information of the anomaly detection model (no in S1502), communication anomaly detector 206 performs the processing in step S1508.

When the acquired communication parsing result matches any combination of pieces of attribute information of the anomaly detection model (yes in S1502), communication anomaly detector 206 acquires the input screen information group at times around (for example, 5 seconds before and after) the target pursing result (S1503).

Communication anomaly detector 206 performs OCR on the acquired input screen information group to acquire the numerical information and its position information displayed on the screen (S1504).

Then, communication anomaly detector 206 compares the anomaly detection model and the value indicated in the communication parsing result (S1505). For example, communication anomaly detector 206 compares the value indicated in the communication parsing result, the entire screen information of the input screen information group obtained by OCR in step S1504, the value indicated in the coordinate information of the anomaly detection model obtained during the learning. Communication anomaly detector 206 acquires, in the anomaly detection model, the value matching OCR coordinates associated with the attribute information when the determination is made to be yes in step S1502, and extracts the value corresponding to the value matching OCR coordinates in the input screen information group obtained by OCR. Then, communication anomaly detector 206 compares the value extracted from the input screen information group and the value included in the communication parsing result.

When the coordinate information of the anomaly detection model whose values match each other is not present (no in S1505), communication anomaly detector 206 determines an anomaly and outputs a detection result indicating an anomaly (S1507).

When the coordinate information of the anomaly detection model whose values match each other is present (yes in S1505), communication anomaly detector 206 determines no anomaly, and determines whether the subsequent communication parsing result is present (S1508). When the subsequent communication parsing result is present (yes in S1508), communication anomaly detector 206 performs the processing in step S1501 on the subsequent communication parsing result, and when the subsequent communication parsing result is not present (no in S1508), communication anomaly detector 206 completes the detection processing.

Although in the present variation, in order to associate the input provided by the user with the communication anomaly detection, the acquisition of the control value by the user through the utilization of OCR on the entire screen and the learning of the association of the numerical information are performed, the position in which the control value is displayed and the attribute information of the communication parsing result in which the control value is reflected on a value column may be previously associated with each other by the user without the learning processing being performed.

As described above, communication anomaly detector 206 in the present variation identifies the target coordinates on the display screen based on the attribute information of the observed packet, and detects a communication anomaly based on whether the value displayed at the target coordinates identified among coordinates of one or more character strings matches the value obtained by parsing the observed communication.

Variation 3 of Embodiment

Although in the embodiment described above, the example is described where the anomaly detection model is switched according to whether the input provided by the user is present, whether the anomaly detection is performed may be switched according to whether the input provided by the user is present. The switching of whether the anomaly detection is performed is an example of the switching of the detection method. For example, in both the learning processing and the detection processing, the model is not switched depending on whether the input has been provided by the user, and simply when the input has been provided by the user most recently in the anomaly detection, the information that the input has been provided by the user most recently may be only reflected on the detection result. In the simplest example, when the input has been provided by the user most recently, the anomaly detection is not performed.

Figure 21:
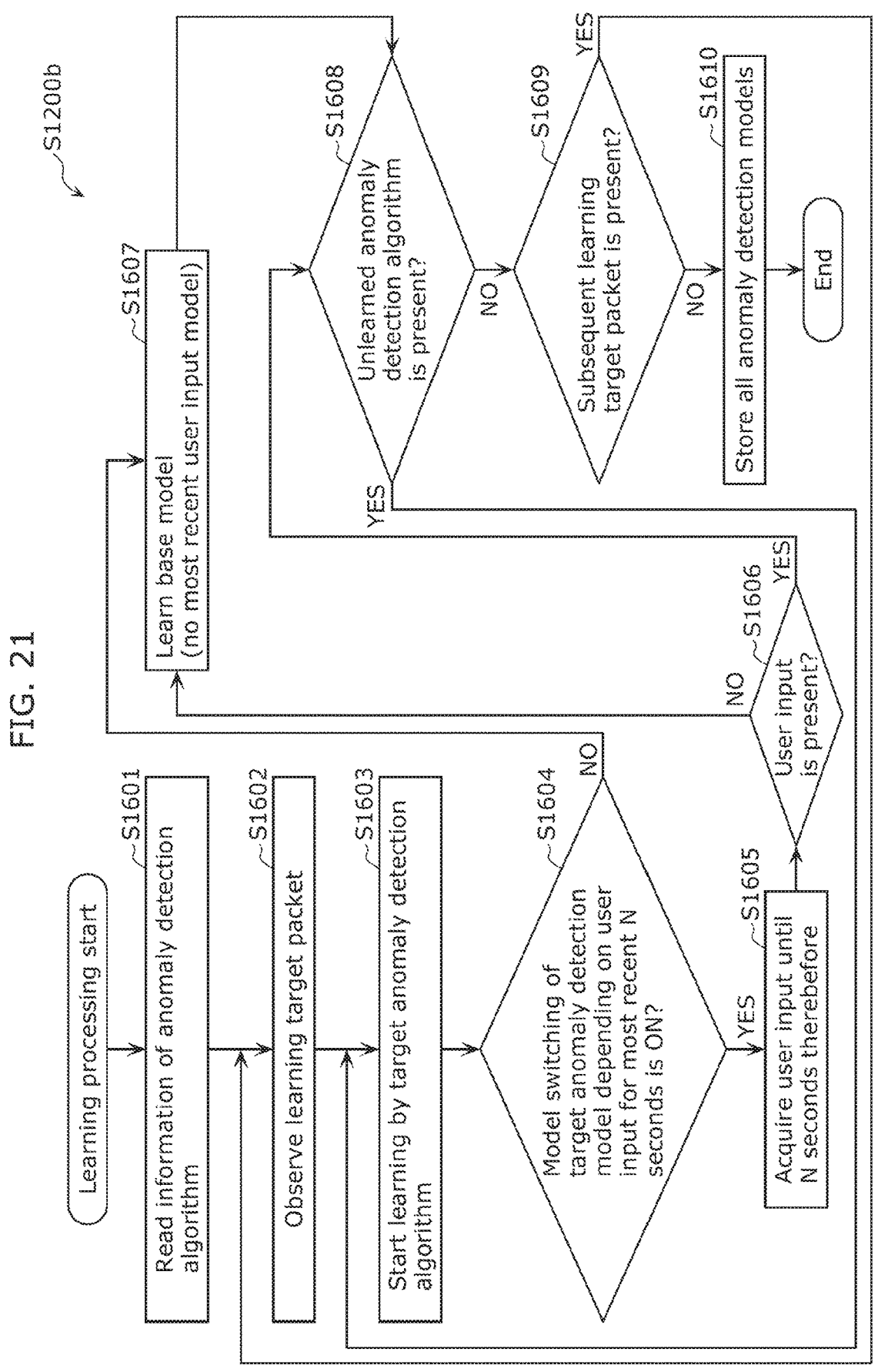
FIG. 21 is a flowchart showing learning processing of a monitoring apparatus according to Variation 3 of the embodiment.

In the present variation, a monitoring method for switching whether the anomaly detection is performed according to whether the input provided by the user is present will be described below with reference to FIGS. 21 and 22. FIG. 21 is a flowchart showing learning processing (S1200b) of monitoring apparatus 200 according to Variation 3 of the embodiment.

In the present variation, as the processing of monitoring apparatus 200, instead of the learning processing (S1200) shown in FIG. 10, the learning processing (S1200b) is performed, and instead of the detection processing (S1300), detection processing (S1300b described later and shown in FIG. 22) is performed. The constituent elements of a control system in the present variation may be the same as those of control system 1 in the embodiment, and in the following description, the constituent elements of control system 1 are used.

Processing steps in steps S1601 to S1605 and steps S1607 to S1610 shown in FIG. 21 are respectively the same as the processing steps in steps S1201 to S1205, step S1207, and steps S1209 to S1211 shown in FIG. 12, and thus description thereof is omitted.

Based on the key input information or the screen information, communication learner 205 determines whether the input has been provided by the user for N seconds therebefore (S1606).

When communication learner 205 determines that the input has not been provided by the user (no in S1606), communication learner 205 learns the base model (no most recent user input model) (S1607), and when communication learner 205 determines that the input has been provided by the user (yes in S1606), communication learner 205 does not learn the anomaly detection model, and proceeds to step S1608. In other words, in the present variation, the most recent user input model is not generated. In the present variation, for example, of the control command white lists shown in FIGS. 8A and 8B, only the control command white list shown in FIG. 8A is generated.

Then, the detection processing performed by communication anomaly detector 206 will be described with reference to FIG. 22. FIG. 22 is a flowchart showing the detection processing (S1300b) of monitoring apparatus 200 according to Variation 3 of the embodiment.

Figure 22:
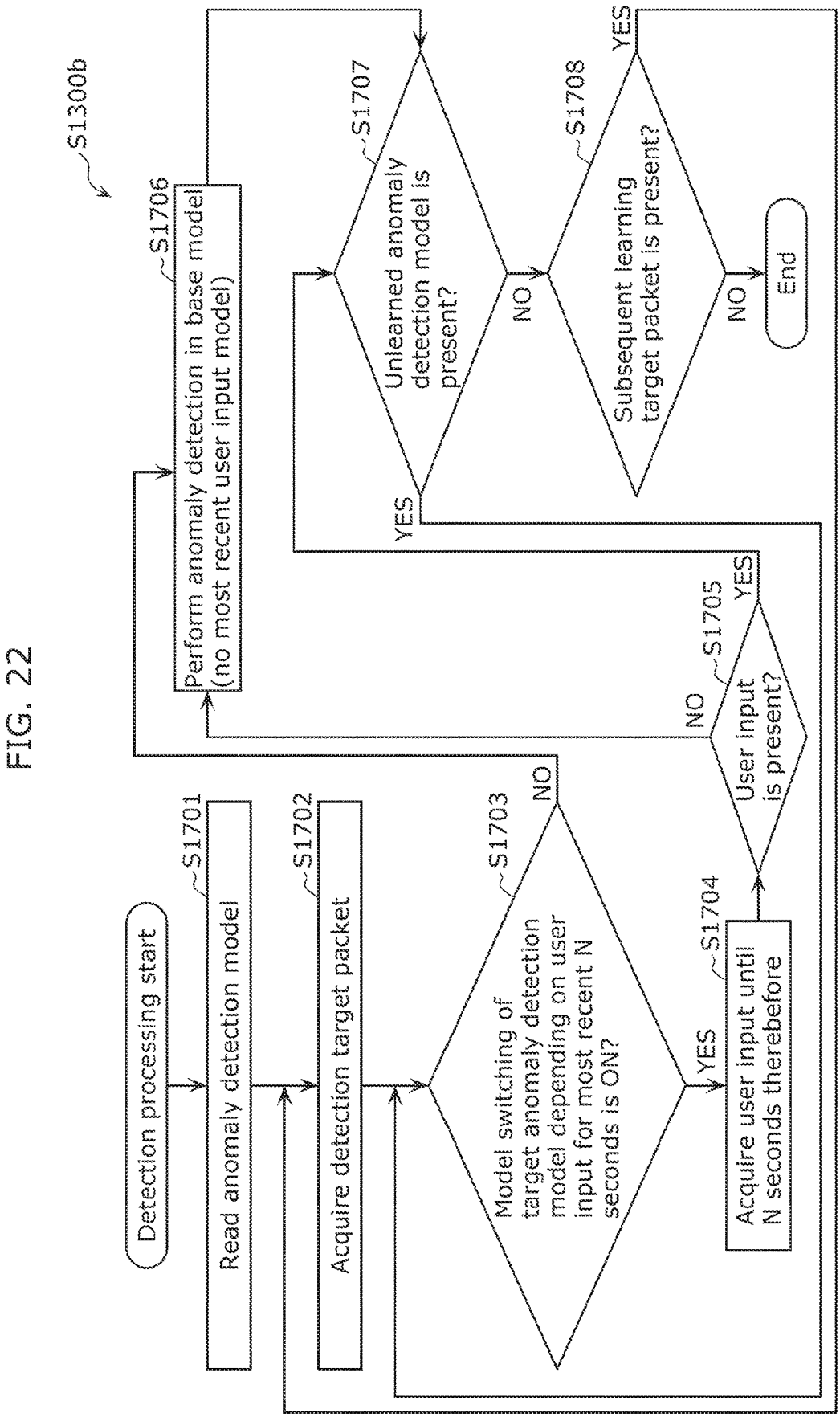
FIG. 22 is a flowchart showing the detection processing of the monitoring apparatus according to Variation 3 of the embodiment.

Processing steps in steps S1701 to S1704 and steps S1706 to S1708 shown in FIG. 22 are respectively the same as the processing steps in steps S1301 to S1304, step S1306, step S1308, and step S1309 shown in FIG. 13, and thus description thereof is omitted.

Based on the key input information or the screen information, communication anomaly detector 206 determines whether the input has been provided by the user for N seconds therebefore (S1705). For example, communication anomaly detector 206 determines whether the input has been provided by the user between the time at which the detection target packet is acquired and a time which is N seconds before the time by using the key input information shown in FIG. 5.

When communication anomaly detector 206 determines that the input has not been provided by the user (no in S1705), communication anomaly detector 206 performs anomaly detection in the no most recent user input model (S1706), and when communication anomaly detector 206 determines that the input has been provided by the user (yes in S1705), communication anomaly detector 206 does not perform the anomaly detection, and proceeds to step S1707.

In other words, in the present variation, only when the input has not been provided by the user for most recent N seconds therebefore, the anomaly detection is performed.

As described above, in the present variation, if the input has been provided by the user to user input device 101 when the detection target packet is transmitted, communication anomaly detector 206 does not detect the communication anomaly using the anomaly detection model for detecting the communication anomaly, and if the input has not been provided by the user to user input device 101 when the detection target packet is transmitted, communication anomaly detector 206 detects the communication anomaly using the anomaly detection model (base model).

As compared with a model if the input has not been provided by the user to user input device 101 when the packet is transmitted, in a model if the input has been provided by the user to user input device 101 when the packet is transmitted, a small amount of data (the key input information or the screen information) for generating the model may be provided. In general, when a large amount of data for generating the model is provided, since the detection performance of the anomaly detection model is enhanced, if the input has been provided by the user, the communication anomaly is not detected, with the result that it is possible to suppress the detection of the communication anomaly using the model having low detection performance.

For example, the processing shown in FIG. 22 may be performed only when a small amount of data for generating the model if the input has been provided by the user to user input device 101 when the packet is transmitted is provided. Communication anomaly detector 206 may determine whether the amount of data used for generating the model is greater than or equal to a predetermined value, and when the amount of data is greater than or equal to the predetermined value, communication anomaly detector 206 may perform the detection processing shown in FIG. 13 and when the amount of data is less than the predetermined value, communication anomaly detector 206 may perform the detection processing shown in FIG. 22.

Other Embodiments

As described above, as examples of the technology disclosed in the present application, the embodiment and the like are described. However, the technology disclosed in the present disclosure is not limited to these examples, and can be applied to embodiments obtained by performing change, replacement, addition, omission and the like as necessary. For example, embodiments obtained by performing various types of variations conceived by a person skilled in the art on the present embodiment and embodiments obtained by combining constituent elements in different embodiments may be included in the present disclosure without departing from the spirit of the present disclosure.

For example, although in the embodiment described above and the like, the example is described where monitoring apparatus 200 generates the control command white lists as shown in FIGS. 8A and 8B, the present disclosure is not limited to this example, and control command white lists may be acquired from an external device. In other words, monitoring apparatus 200 may acquire the anomaly detection model from an external device without generating it.

Although in the description of the embodiment described above and the like, the anomaly detection model is the list, the present disclosure is not limited to this configuration, and the anomaly detection model may be, for example, a machine learning model. In this case, communication learner 205 may generate a first machine learning model and a second machine learning model. If the input has been provided by the user to user input device 101 when a packet is transmitted in the learning period, the first machine learning model is generated by machine learning with the attribute information of the packet set to input information and normal or an anomaly set to output information (correct answer information), and if the input has not been provided by the user to the user input device when a packet is transmitted in the learning period, the second machine learning model is generated by machine learning with the attribute information of the packet set to input information and normal or an anomaly set to correct answer information. For example, if the input has not been provided by the user to user input device 101 when a packet is transmitted in the learning period, communication learner 205 may use only the attribute information of the packet to generate one machine learning model which is generated by machine learning with the attribute information set to input information and normal or an anomaly set to correct answer information.

Although in the embodiment described above and the like, the example is described where the monitoring target device (central monitoring control device) is a control device for controlling production facilities in a factory, the application of the monitoring target device is not limited to this example. The monitoring target device may be a device which performs communication that does not depend on human input such as regular communication performed mechanically, and which performs communication that is generated by human input. The monitoring target device may be a device which is used in facilities such as a hospital, a school, and a home.

In the embodiment, the constituent elements of monitoring apparatus 200 may be individually integrated into one chip by a semiconductor device such as an integrated circuit (IC) or a large scale integration (LSI) circuit or may be integrated into one chip such that the one chip includes a part or all thereof. Although the LSI circuit is described here as the semiconductor device, it may also be referred to as an IC, a system LSI circuit, a super LSI circuit, or an ultra LSI circuit depending on the degree of the integration. A method for forming an integrated circuit is not limited to LSI, and may be realized by a dedicated circuit or a general-purpose processor. A field programmable gate array (FPGA) which can be programmed after an LSI circuit is manufactured or a reconfigurable processor which can reconfigure the connections and settings of circuit cells inside the LSI circuit may be utilized. Furthermore, if an integrated circuit technology which replaces LSI appears due to advances in semiconductor technology or another derived technology, the technology may be used to integrate functional blocks. Biotechnology or the like is likely to be applied. The system LSI circuit is an ultra-multifunctional LSI circuit which is manufactured by integrating a plurality of processing units on a single chip, and is specifically a computer system which includes a microprocessor, a read only memory (ROM), a random access memory (RAM), and the like. In the ROM, a computer program is stored. The microprocessor is operated according to the computer program, and thus the system LSI circuit achieves its function.

In the embodiment described above and the like, the constituent elements may be formed by dedicated hardware or may be realized by executing software programs suitable for the constituent elements. A program executor such as a CPU or a processor may read and execute software programs recorded in a recording medium such as a hard disk or a semiconductor memory to realize the constituent elements.

The order in which steps in the flowchart are performed is intended to specifically describe and illustrate the present disclosure, and an order other than the order described above may be used. A part of the steps may be performed simultaneously with (parallel to) other steps or a part of the steps do not need to be performed.

The division of functional blocks in the block diagram is an example, and a plurality of functional blocks may be realized as one functional block, one functional block may be divided into a plurality of functional blocks, and some functions may be transferred to other functional blocks. A single piece of hardware or software may process the functions of a plurality of functional blocks having similar functions in parallel or in a time division manner.

Monitoring apparatus 200 according to the embodiment described above and the like may be realized as a single device or may be realized by a plurality of devices. When monitoring apparatus 200 is realized by a plurality of devices, how the constituent elements included in monitoring apparatus 200 are assigned to the devices is not limited. When monitoring apparatus 200 is realized by a plurality of devices, a communication method between the devices is not particularly limited, and may be wireless communication or wired communication. Between the devices, wireless communication and wired communication may be combined.

One aspect of the present disclosure may be a computer program which causes a computer to execute characteristic steps included in a data generation method shown in any one of FIGS. 10 to 13, 15, and 20 to 22.

For example, the program may be a program for causing a computer to perform execution. One aspect of the present disclosure may be a computer-readable non-transitory recording medium in which such a program is recorded. For example, such a program may be recorded in a recording medium so as to be distributed or circulated. For example, the distributed program is installed in a device having another processor, and thus a processor is caused to execute the program, with the result that the device can be caused to perform the processing described above.

INDUSTRIAL APPLICABILITY

The present disclosure is useful for a monitoring apparatus and a monitoring method which determine whether a communication anomaly detected on a network is caused by an operation of a user.

The invention claimed is:
1. A monitoring apparatus, comprising:
a processor; and
a memory including a program that, when executed by the processor, causes the processor to perform operations, the operations including:
acquiring key input information based on an input provided by a user; and
detecting a communication anomaly in a communication that is observed on a network,
wherein the processor detects the communication anomaly based on information about a packet whose source or destination includes a monitoring target device, by determining whether the information about the packet matches the key input information acquired based on the input corresponding to the packet, the key input information based on the input includes screen information indicating a display screen of the monitoring target device when the packet is transmitted, and the processor detects the communication anomaly based on the information about the packet whose source or destination includes the monitoring target device and the screen information corresponding to the packet.

2. The monitoring apparatus according to claim 1, wherein the key input information based on the input includes history information indicating a history of input provided by the user when the packet is transmitted, and the processor switches a method for detecting the communication anomaly according to the history information.

3. The monitoring apparatus according to claim 2, wherein the history information indicates whether the input has been provided by the user when the packet is transmitted, and the processor switches the method for detecting the communication anomaly according to whether the input has been provided by the user when the packet is transmitted.

4. The monitoring apparatus according to claim 3, wherein the processor switches a model for detecting the communication anomaly when switching of the method for detecting the communication anomaly.

5. The monitoring apparatus according to claim 4, wherein when the input has been provided by the user when the packet is transmitted, the processor does not detect the communication anomaly using the model for detecting the communication anomaly, and when the input has not been provided by the user when the packet is transmitted, the processor detects the communication anomaly using the model.

6. The monitoring apparatus according to claim 4, wherein the operations further include:

learning the model based on a predetermined learning period.

7. The monitoring apparatus according to claim 6, wherein the processor generates a first list and a second list as the model, the first list is learned based on first attribute information of a first packet when the input is provided by the user at a first time of transmission of the first packet during the predetermined learning period, and the second list is learned based on second attribute information of a second packet when the input is not provided by the user at a second time of transmission of the second packet during the predetermined learning period.

8. The monitoring apparatus according to claim 6, wherein the processor generates a first machine learning model and a second machine learning model as the model, the first machine learning model is learned by first machine learning using: first input information that is first attribute information of a first packet when the input is provided by the user at a first time of transmission of the first packet during the predetermined learning period; and first correct answer information that is a first detection result indicating normal or anomaly, and the second machine learning model is learned by second machine learning using: second input information that is second attribute information of a second packet when the input is not provided by the user at a second time of transmission of the second packet during the predetermined learning period; and second correct answer information that is a second detection result indicating normal or anomaly.

9. The monitoring apparatus according to claim 1, wherein the processor detects the communication anomaly based on coordinates and a value of a character string obtained by performing optical character recognition (OCR) on the screen information corresponding to the packet and a value obtained by parsing the packet.

10. The monitoring apparatus according to claim 9, wherein the processor identifies target coordinates on the display screen based on attribute information of the packet, and detects the communication anomaly based on whether a value displayed at the target coordinates identified among coordinates of one or more character strings, each being the character string, matches the value obtained by parsing the packet.

11. The monitoring apparatus according to claim 10, wherein the operations further include:

learning, based on a predetermined learning period, a model for identifying the target coordinates on the display screen.

12. The monitoring apparatus according to claim 11, wherein the model is a list in which the attribute information of the packet is associated with the target coordinates on the display screen.

13. The monitoring apparatus according to claim 12, wherein the target coordinates are coordinates at which a value that matches the value obtained by parsing the packet is displayed on the display screen when the packet is transmitted in the predetermined learning period.

14. The monitoring apparatus according to claim 1, wherein software that is capable of transferring the key input information based on the input to the monitoring apparatus is installed in the monitoring target device, and the processor acquires the key input information when the software transfers the key input information based on the input.

15. The monitoring apparatus according to claim 1, further comprising:

a transfer device that is connected between the processor and the monitoring target device and that is capable of transferring the key input information based on the input to the monitoring apparatus, wherein the user input acquirer acquires the key input information when the transfer device transfers the key input information based on the input.

16. The monitoring apparatus according to claim 1, wherein the monitoring target device is a control device for controlling a production facility provided in a factory.

17. A monitoring method comprising:

acquiring key input information based on an input provided by a user; and detecting, by a processor, a communication anomaly in a communication that is observed on a network, wherein the processor detects the communication anomaly based on information about a packet whose source or destination includes a monitoring target device, by determining whether the information about the packet matches the key input information acquired based on the input corresponding to the packet, the key input information based on the input includes screen information indicating a display screen of the monitoring target device when the packet is transmitted, and the processor detects the communication anomaly based on the information about the packet whose source or destination includes the monitoring target device and the screen information corresponding to the packet.

18. The monitoring apparatus according to claim 1, wherein the key input information includes keystroke information.

\* \* \* \* \*